United States Patent

Kisaichi et al.

[11] Patent Number: 6,061,480
[45] Date of Patent: *May 9, 2000

[54] COORDINATE INPUT DEVICE

[75] Inventors: Kazuhiro Kisaichi, Hino; Jitsu Iwaki, Kunitachi; Toshiro Nose, Sagamihara; Nobuhiro Inoue, Hachioji; Toshihiko Nannichi, Fuchu, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/616,317

[22] Filed: Mar. 15, 1996

[30] Foreign Application Priority Data

Mar. 15, 1995 [JP] Japan .................................. 7-055639

[51] Int. Cl.[7] .............................. G06K 9/22; G06K 9/18; G06K 9/00; G09G 5/00
[52] U.S. Cl. .......................... 382/315; 382/189; 382/186; 345/173
[58] Field of Search .................................. 382/312–317, 382/186–189; 345/173–175, 179, 104, 156, 168, 87, 182; 349/158, 159, 161, 96, 58, 61, 70; 178/18

[56] References Cited

U.S. PATENT DOCUMENTS

| | | | |
|---|---|---|---|
| 4,531,237 | 7/1985 | Bar-on et al. ............................ | 455/343 |
| 4,775,765 | 10/1988 | Kimura et al. ............................ | 345/173 |
| 5,303,288 | 4/1994 | Duffy et al. ............................. | 455/566 |
| 5,327,163 | 7/1994 | Hashimoto et al. ...................... | 345/173 |
| 5,451,724 | 9/1995 | Nakazawa et al. ...................... | 345/173 |
| 5,623,677 | 4/1997 | Townsley et al. .................. | 395/750.02 |

*Primary Examiner*—Thomas D. Lee
*Assistant Examiner*—Wenpeng Chen
*Attorney, Agent, or Firm*—Banner & Witcoff, Ltd.

[57] ABSTRACT

The present invention concerns a coordinate input device for entering coordinate values by superposing on a display device (LCD or CRT). The device is comprised of a coordinate input section wherein a first conductive sheet for x-coordinate detection provided with electrodes on a pair of end edges and a second conductive sheet for y-coordinate detection provided with electrodes on a pair of end edges are superposed through a spacer so that respective electrodes intersect orthogonally. In a low power consumption mode of operation; a predetermined voltage is applied between one of the electrodes of the first conductive sheet and one of electrodes of the second conductive sheet for detecting a variation of the voltage. When the voltage varies the device switches, a predetermined voltage is applied between one electrode x1 of the first conductive sheet and one electrode y2 of the second conductive sheet. When the voltage does not vary, no current flows between the pair of electrodes x1, x2 (or y1, y2) of either of the first conductive sheet or the second conductive sheet, therefore the low power consumption is maintained.

40 Claims, 22 Drawing Sheets

| CODE | WORD | OTHER DICTIONARY INFORMATION |
|---|---|---|
| 86596 | Tokyo | ＊＊＊＊＊＊ |
| 566366 | London | ＊＊＊＊＊＊ |
| 92824 | watch | ＊＊＊＊＊＊ |
| 25625 | clock | ＊＊＊＊＊＊ |

14E

| SINGLE CHARACTER WORD |
|---|
| 2 CHARACTER WORD |
| 3 CHARACTER WORD |
| 4 CHARACTER WORD |
| 5 CHARACTER WORD |
| : |
| n CHARACTER WORD |

14E

| x | y | REGION NUMBER |
|---|---|---|
| x1 | y1 | 1 |
| x2 | y2 | 1 |
| ⋮ | ⋮ | ⋮ |
| xi | yi | 2 |
| xi+1 | yi+1 | 3 |
| ⋮ | ⋮ | ⋮ |
| xm | ym | 4 |

COORDINATE INPUT DEVICE

FIELD OF THE INVENTION

The present invention concerns a coordinate input device appropriate for superposing coordinates on an LCD or CRT display device or others.

DESCRIPTION OF THE PRIOR ART

Among coordinate input devices of the prior art, a device including the composition of a touch panel (input panel) as a coordinate input component as shown in FIG. 26 is well-known. In this composition, a first conductive sheet 151 for x-coordinate detection provided with electrodes x1 and x2 on a pair of end edges and a second conductive sheet 152 for y-coordinate detection provided with electrodes y1 and y2 on a pair of end edges are superposed through a spacer 153 so that respective electrodes x1, x2 and y1, y2 intersect orthogonally. The first conductive sheet 151, the second conductive sheet 152 and the spacer 153 are all transparent. Under the first conductive sheet 151, a screen (such as an LCD or CRT display device or others) is disposed through an insulator plate composed of a transparent glass plate or reinforced plastic. A transparent aeolotropic conductive rubber sheet, lattice member, conveniently perforated sheet or equivalent may be utilized for said spacer 153. In a normal state, the spacer 153 isolates the first conductive sheet 151 and the second conductive sheet 152; however, when the device is compressed by an input pen or others, it acts to cause conduction between the first conductive sheet 151 and the second conductive sheet 152.

The electric arrangement of said coordinate input device is as shown in FIG. 28. In other words, in this arrangement, an A/D converter 204 is connected to a touch panel 201 constituting the coordinate input section through a switch for changing the coordinate axis to be detected. An x/y control section 203 is connected to a CPU 205 so as to allow to direct change-over of respective switches 202-1 to 202-3 of a switch section 202. The switch 202-1 of the switch section 202 is a switch for change-over so as to supply one of the electrodes y2, x2 with voltage VCC; the switch 202-2 is a switch for change-over so as to supply one of the electrodes y1, x1 with earth potential; and the switch 202-3 is a switch for change-over so as to supply the A/D converter 204 with one of the coordinate value of x-coordinate or y-coordinate. In response to the direction from the CPU 205, the x/y control section 203 changes over respective switches 202-1 to 202-3 of the switch section 202 through a signal line 208. This FIG. 28 shows that the respective switches 202-1 to 202-3 are changed over so as to permit the detection of the coordinate value of the y-coordinate.

In said coordinate input device, as shown in FIG. 26, when a point p is pressed by an input pen or else, a current flowing to the electrode y2 by a voltage VCC is directed to the corresponding position of the first conductive sheet 151 from the point p and then to the A/D converter 204 flowing to the direction of the electrode x1. Here, y direction voltage Vy of the point p is given by the following expression:

$$Vy=(VCC \times R1)/(R1+R2)$$

where R1 is the resistance value between the electrode y1 and the point p on the second conductive sheet 152 and R2 is the resistance value between the electrode y2 and the point p on the second conductive sheet 152. Signals directed to the A/D converter 204 correspond to the voltage Vy of said point p, y-coordinate value of the point p may be obtained considering the voltage drop due to the first conductive sheet 151. For instance, a y-coordinate value may be obtained easily by providing the CPU 205 with a table for correlating the output value of the A/D converter 204 when respective points of the touch panel 201 are operated. Y coordinate values and X coordinate values also may be obtained easily by providing a similar table.

However, there is an inconvenience with this prior art device in that, as the voltage VCC is applied to the electrode y2 on the second conductive sheet 152 and the electrode y1 is supplied with earth potential, even when there is no input operation, current flows between the electrodes y1 and y2 as shown by arrows in FIG. 27 so as to consume power. It would not provoke a problem when the power is securely supplied from a power source as in a cash dispenser (CD) of a bank, for instance. However, it provokes a critical difficulty for a device working on batteries such as mobile terminals.

DISCLOSURE OF THE PRESENT INVENTION

The first object of the present invention is to provide a coordinate input device reducing useless power consumption and which may be applied to mobile terminals.

The second object of the present invention is to provide a coordinate input device for responding appropriately to the coordinate input operation to obtain necessary coordinate values.

The third object of the present invention is to provide a coordinate input device which shifts to the low power consumption mode when the coordinate input operation is not performed for a predetermined period of time.

The fourth object of the present invention is to provide a coordinate input device which may be attached to the screen of a display device and may be used as a device for indicating a position on the screen or the like.

The fifth object of the present invention is to provide a coordinate input device which may be attached to the screen of a cellular telephone display device used as a device for indicating a position on the screen or the like.

The sixth object of the present invention is to provide a coordinate input device which may be attached to the screen of the display device of a cellular telephone and provided with character input function for using it as a device for indicating a position on the screen or the like.

The coordinate input device of the present invention comprises a coordinate input wherein a first conductive sheet for x-coordinate detection, provided with electrodes on a pair of end edges, and a second conductive sheet for y-coordinate detection, provided with electrodes on a pair of end edges, are superposed through a spacer so that respective electrodes intersect orthogonally and a mode control means for shifting to coordinate input reception mode by applying a predetermined voltage between one of electrodes of said second conductive sheet and detecting the variation of said voltage.

Thus, a predetermined voltage is applied between one of electrodes of the first conductive sheet and one of the electrodes of the second conductive sheet and these electrodes are insulated by a spacer. In other words, for both of the first conductive sheet and the second conductive sheet, current does not flow between a pair of electrodes disposed thereon when set in a stand-by state (mode) of low power consumption. In this stand-by mode, it is possible to detect any input by monitoring the variation of the predetermined voltage applied between one of electrodes of the first conductive sheet and one of electrodes of said second conductive sheet.

Moreover, the coordinate input device of the present invention comprises a selection means for selecting the signal from one of the first conductive sheet and the second conductive sheet, a central control section for loading the coordinate value through this selection means, a stand-by control section for selectively applying a predetermined voltage between both electrodes of said first conductive sheet or both electrodes of said second conductive sheet or applying a predetermined voltage between one of electrodes of said first conductive sheet and one of electrodes of said second conductive sheet based on the direction from this central control section and a logic circuit for transmitting the variation of the predetermined voltage to said central control section when a predetermined voltage is applied between one of electrodes of said first conductive sheet and one of electrodes of said second conductive sheet by this stand-by control section, wherein said central control section shifts to a mode for loading the coordinate value when the variation of the predetermined potential is detected by this logic circuit.

Thus, the central control section detects the variation of the predetermined potential by the logic circuit when a predetermined voltage is applied between one of the electrodes of said first conductive sheet and one of the electrodes of said second conductive sheet, during a period of time corresponding to the low power consumption state. When a variation appears on the predetermined voltage output from the logic circuit, in order to load the coordinate value, the central control section directs the stand-by control section to apply a predetermined voltage between both electrodes of said first conductive sheet or both electrodes of said second conductive sheet and shifts to the coordinate value loading mode.

When a coordinate value is not input within a predetermined period of time, a predetermined voltage is applied between one of electrodes of said first conductive sheet and one of electrodes of said second conductive sheet. Thus, the device shifts to the low power consumption state without any current flowing between the pair of electrodes both on the first conductive sheet and the second conductive sheet.

On the other hand, during the stand-by state during which the central control section detects the variation of the predetermined voltage by the logic circuit, if a coordinate is input, said predetermined voltage changes and is detected. Then, a predetermined voltage is applied between both electrodes of the first conductive sheet or between both electrodes of the second conductive sheet so as to shift a mode capable of detecting the coordinate value.

Moreover, by operating in the low power consumption mode during the variation of the predetermined voltage as it is detected by the logic circuit, and in the normal operation mode for loading the coordinate value, useless power consumption is prevented.

DETAILED DESCRIPTION OF THE INVENTION

Figure 1:
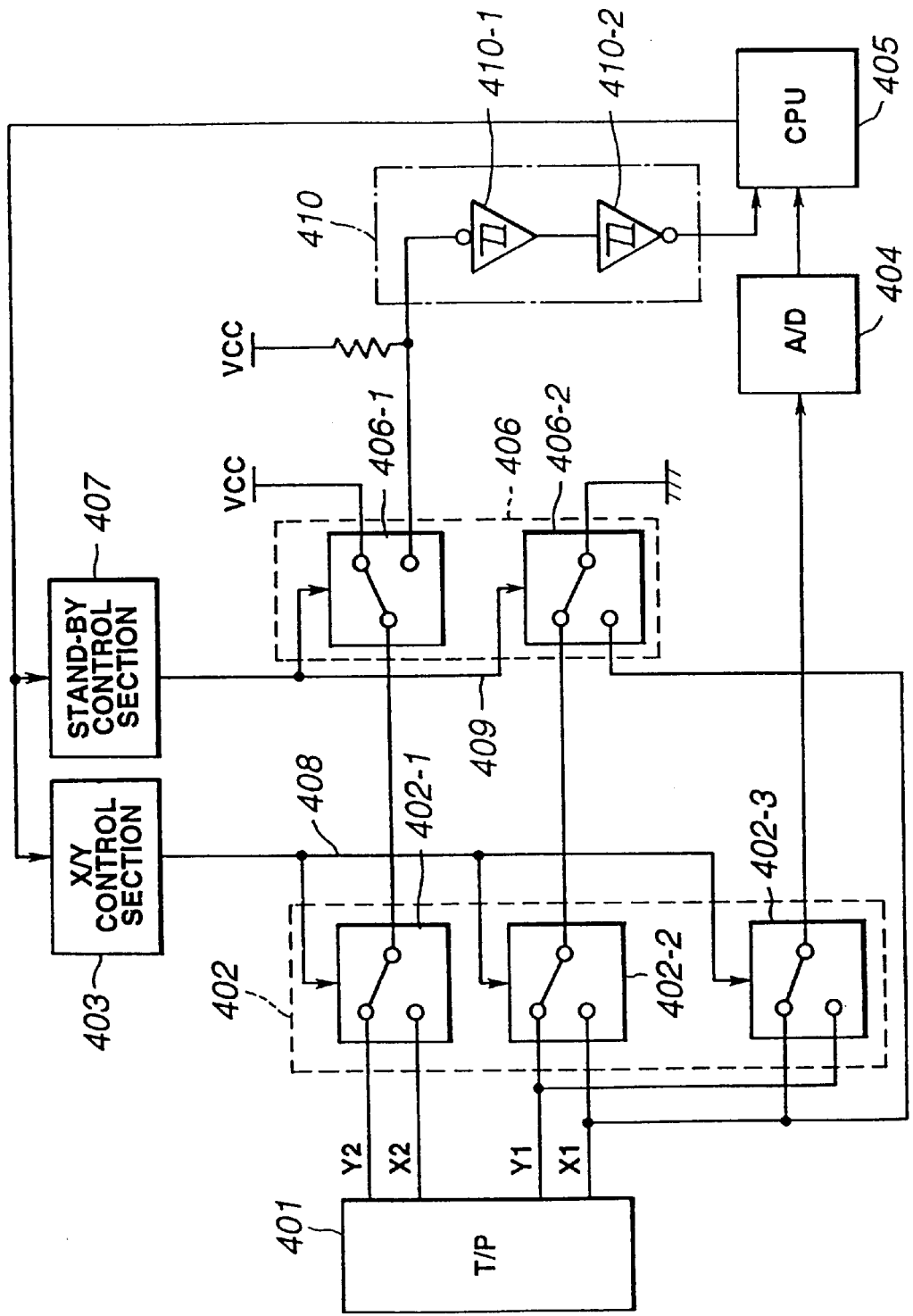
FIG. 1 is a composition diagram showing the normal processing mode of the coordinate input device according to an embodiment of the invention.

FIG. 1 is a composition diagram showing the coordinate input device according to an embodiment of the invention. The coordinate input device according to the embodiment comprises a CPU (which is a central control section) 405 for integrally controlling the device and for obtaining the coordinate value; a touch panel section 401 constituting the coordinate input section; a switch section 402 for changing over the coordinate detection mode of y-axis and the coordinate detection mode of x-axis of this touch panel section 401; an x/y control section 403 for changing over this switch section 402 based on the instruction supplied by said CPU 405; a switch section 406 for changing the voltage to be supplied to the touch panel section 401; a stand-by control section 407 for changing over this switch section 406 based on the instruction supplied by said CPU 405; an A/D converter 404 for loading the coordinate value of y-coordinate or the coordinate value of x-coordinate of the touch panel section 401; and a logic circuit 410 for communicating the variation of the predetermined voltage by the input operation of the touch panel 402.

Figure 3:
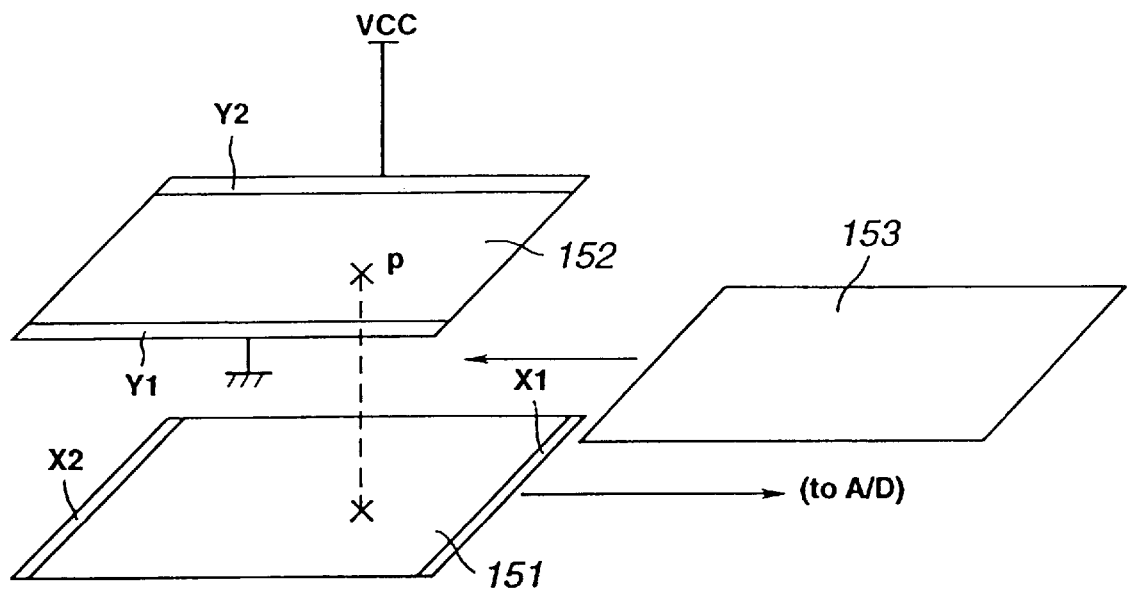
FIG. 3 is a composition diagram showing the normal processing mode by the coordinate input section of the coordinate input device according to an embodiment of the invention.

Said touch panel section 401 is composed as shown in FIG. 3. In this composition, a first conductive sheet 151 for x-coordinate detection provided with electrodes x1 and x2 on a pair of end edges, and a second conductive sheet 152 for y-coordinate detection having electrodes y1 and y2 on a pair of end edges are superposed through a spacer 153 so that respective electrodes x1, x2 and y1, y2 intersect orthogonally. The first conductive sheet 151, the second conductive sheet 152 and the spacer 153 are all transparent. Under the first conductive sheet 151, a screen, such as LCD or CRT display devices or others, is disposed through an insulator plate composed of a transparent glass plate or reinforced plastic. As for said spacer 153, a transparent aeolotropic conductive rubber sheet, lattice member or conveniently perforated sheet may be adopted. In a normal state, the spacer 153 isolates the first conductive sheet 151 and the second conductive sheet 152. However, when it is compressed by an input pen or others, it acts for electrically conducting the first conductive sheet 151 and the second conductive sheet 152.

In said coordinate input section, the electrode x2 of the first conductive sheet 151 and the electrode y2 of the second conductive sheet 152 are connected to a switch 402-1 of the switch section 402, and the electrode x1 of the first conductive sheet 151 and the electrode y1 of the second conductive sheet 152 are connected to a switch 402-2 and a switch 402-3 of the switch section 402. On the other hand, the switch section 406 includes a switch 406-1 for changing over to supply the switch 402-1 directly with the power VCC or to supply the switch 402-1 with the power VCC through a pull-up resistor, and a switch 406-2 for changing over to supply the x1 electrode or the y1 electrode of the switch 402-2 of the switch section 402 with earth potential.

The logic circuit 410 comprises two inverters 410-1, 410-2 of Schmidt trigger type and is arranged to supply the CPU 405 with an interrupt signal of a logic value based on the voltage VCC supplied through the pull-up resistor. Here, the inverter 410-1 is an inverter for chattering prevention and the inverter 410-2 is an inverter for transmitting an interrupt signal of input operation start on the touch panel section 401 by negative logic.

Figure 2:
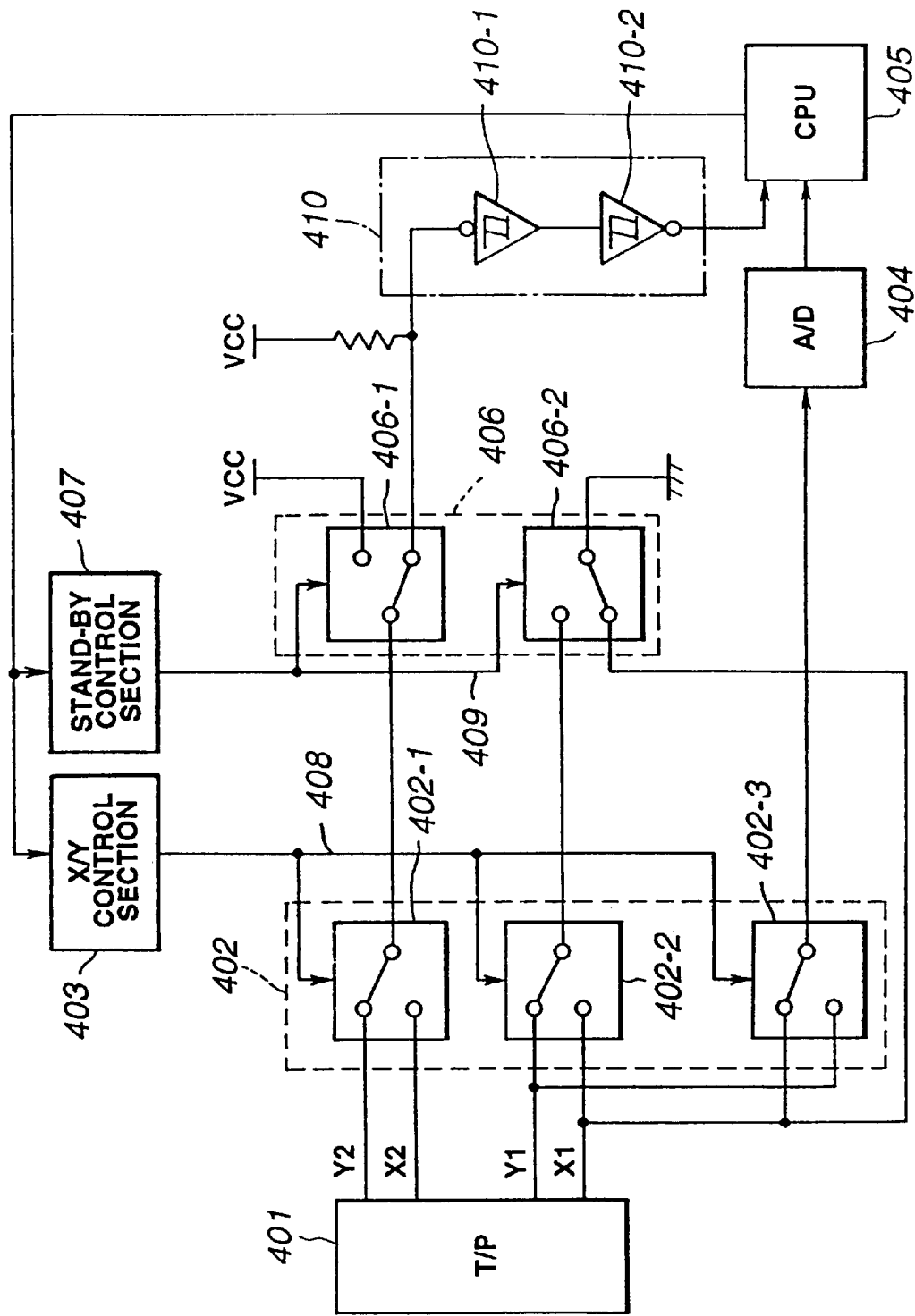
FIG. 2 is a composition diagram showing the stand-by mode of the coordinate input device according to an embodiment of the invention.
Figure 5:
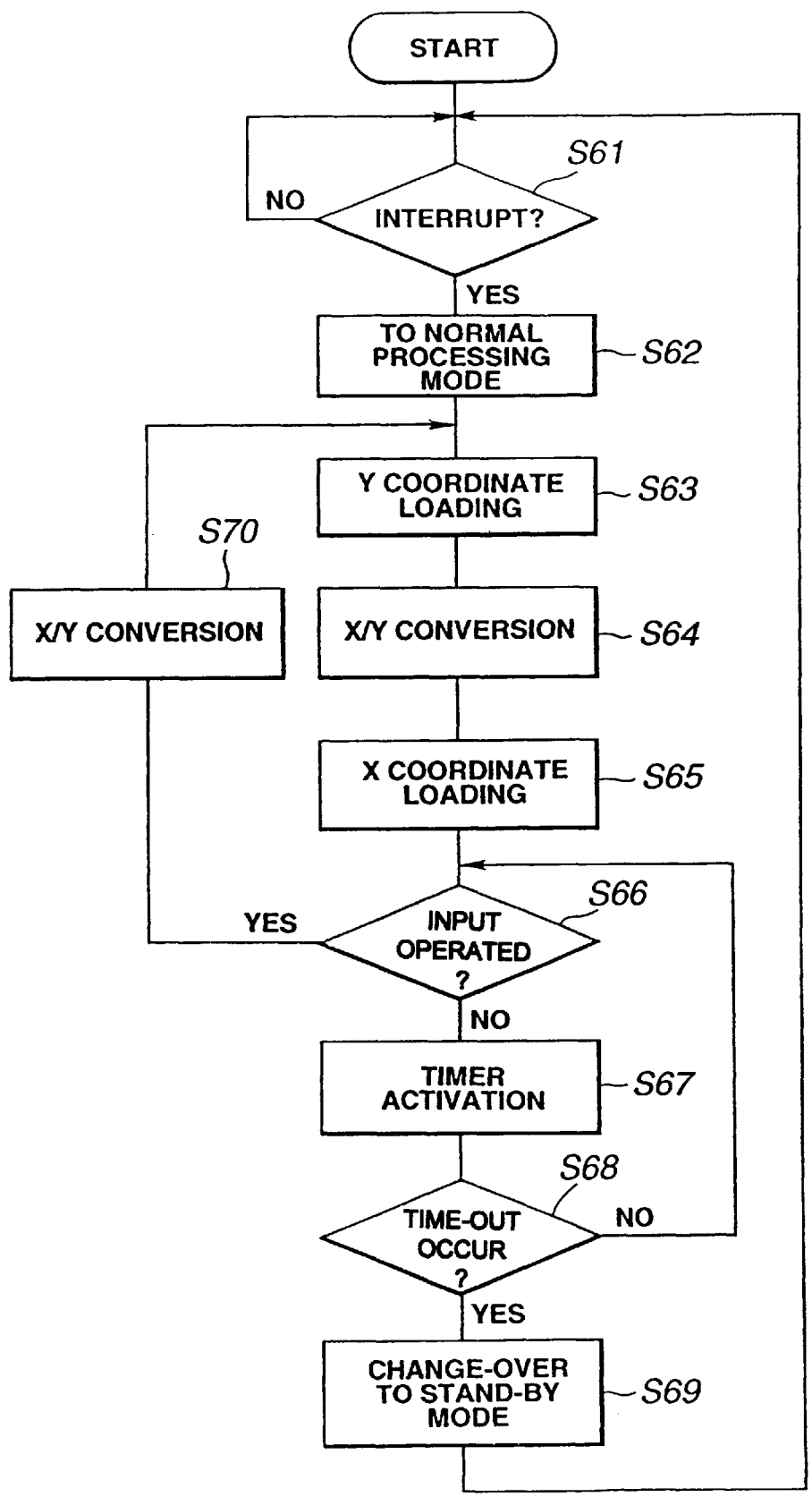
FIG. 5 is a flowchart showing the operation of the coordinate input device according to an embodiment of the invention.

In the coordinate input device composed as mentioned above, in the initial state, respective switches of the switch section 402 and the switch section 406 are initially set as shown in FIG. 2. Therefore, the CPU 405 receives H level through the logic circuit 410. The CPU 405 executes the coordinate value loading processing according to the program corresponding to the flowchart shown in FIG. 5. Now the operation will be described based on this.

The CPU 405 detects if there is an interrupt comprising the start of an input operation on the touch panel section 401 by the output from the logic circuit 410. This state corresponds to the stand-by mode and as shown in FIG. 2, the voltage VCC pulled up by the resistor is selected by the switch 406-1 and applied to the electrode y2 of the second conductive sheet 152 through the switch 402-1 and the earth potential is selected by the switch 406-2 and applied to the electrode x1 of the first conductive sheet 151. The state of this stand-by mode is shown in FIG. 4.

Figure 4:
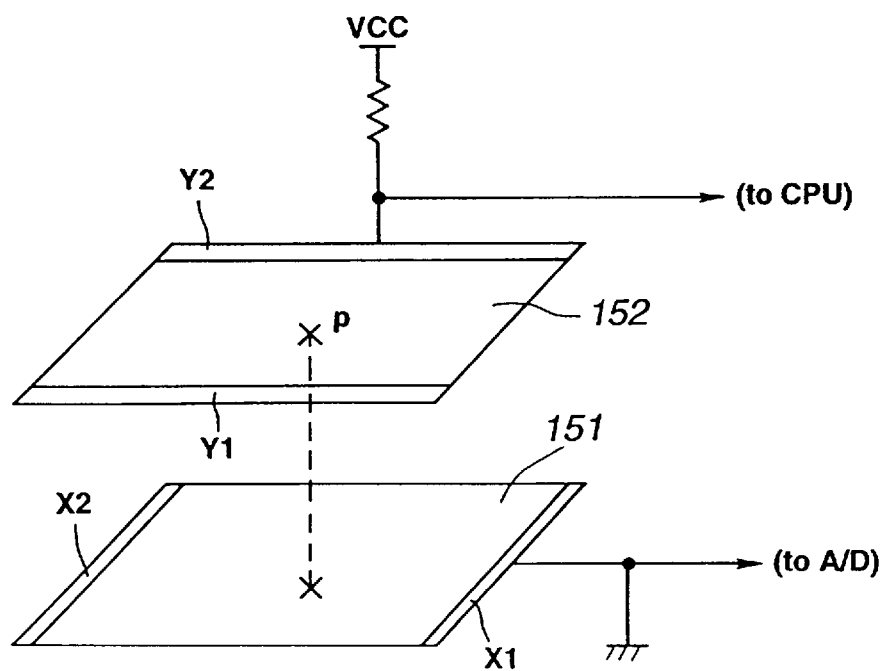
FIG. 4 is a composition diagram showing the stand-by mode by the coordinate input section of the coordinate input device according to an embodiment of the invention.

As apparent from this FIG. 4, both on the first conductive sheet 151 and the second conductive sheet 152, neither voltage VCC nor earth potential are applied between the opposed sheet of the same sheet and no current flows so long as there is no key operation allowing to reduce the power consumption. In FIG. 4, the spacer 153 is omitted.

In said stand-by mode, if an input operation is made on the touch panel section 401, as apparent from FIG. 4, current flows to the input point by pulled up voltage VCC applied to the electrode y2, then the current flows to the earth level electrode x1 from the corresponding point on the second conductive sheet 152 through the spacer 153. As a result, the input side potential of the logic circuit 410 decreases to the L level logically and the CPU 405 is supplied with an interrupt signal of negative logic (L level). There, the CPU 405 branches to YES at the step S61 of the flowchart of FIG. 5 for shifting to the normal processing mode (S62).

In other words, a stand-by control section 407 is supplied with a change-over instruction signal to the normal processing mode. The stand-by control section 407 outputs through a signal line 409 a control signal so as to change over the switch section 406 from the state of FIG. 2 to the state of FIG. 1. Thus, the normal processing mode shown in FIG. 1 is provided. In this way, the CPU 405 acts as a mode control means for shifting to the mode accepting the coordinate input (normal processing mode) by applying a predetermined voltage VCC between one electrode x1 of the first conductive sheet 151 and one electrode y2 of the second conductive sheet 152, and by detecting the variation of the voltage VCC.

By said switching, the voltage VCC is applied directly to the electrode y2 of said second conductive sheet 152 and the earth potential is applied to the electrode y1. Thus, when an operation is made by an imput pen or the like on a point p indicated in FIG. 1, a current flowing from the voltage VCC to the electrode y2 is directed from the point p to the corresponding point of the first conductive sheet 151 and then to the electrode x1 before arriving at the A/D converter 404.

Here, y direction voltage Vy of the point p is given by the following expression:

$$Vy=(VCC \times R1)/(R1+R2)$$

where R1 is the resistance value between the electrode y1 and the point p on the second conductive sheet 152, and R2 is the resistance value between the electrode y2 and the point p on the second conductive sheet 152. Signals directed to the A/D converter 404 correspond to the voltage Vy of said point p, and y-coordinate value of the point p may be obtained considering the voltage drop due to the first conductive sheet 151. For instance, y-coordinate value may be obtained easily by providing the CPU 405 with a table for correlating the output value of the A/D converter 404 when respective points on the touch panel 401 are operated with y-coordinate values. Then the CPU 405 loads the y-coordinate value (S63). Moreover, sending the control signal to the x/y control section 403 changes the respective switches of the switch section 402 (S64), and loads x-coordinate value (S65). By providing the CPU 405 with a conversion table similar to that used for the correlating y-coordinate, between the sensed potential and the x-coordinate value, the x-coordinate value also may be easily obtained.

Next, the CPU 405 detects if the next coordinate value is obtained based on the output value of the A/D converter 404 (S66). If the output of the A/D converter 404 corresponds to the potential generated by the input on the touch panel section 401, in other words, if the output is other than the digital value corresponding to 0 volts which represents the absence of operation, the CPU 405 delivers a control signal to the x/y control section 403 for switching the respective switches of the switch section 402 (S70) and reiterates the processing from the loading of the coordinate value of y-coordinate (S63). On the other hand, in the step 66, if the output of the A/D converter 404 corresponds to the potential of null input on the touch panel section 401, in other words, if the output is the digital value corresponding to 0 volt representing the absence of operation, it branches to NO for actuating a built-in timer (S67). It also detects if time-out occurs (S68) and if the time is not up, it returns to the step S66 for reiterating the processing. On the other hand, if no input is made during a prescribed period of time on the touch panel section 401 time-out occurs, so it proceeds from the step S68 to the step S69 for supplying the stand-by control section 407 with a switching instruction signal to the stand-by mode. The stand-by control section 407 delivers a control signal through the signal line 409 for changing the respective switches of the switch section 406 from the state of FIG. 1 to the state of FIG. 2. Thus, the stand-by mode as shown in FIG. 2 is provided.

Still lower power consumption may be attained by adopting a recently developed processor having a low power consumption mode and a normal operation mode that can be used by selecting one of these modes as the operating mode of the CPU 405 of said embodiment. Namely, when said processor is adopted, it may be composed to operate in the low power consumption mode if the variation of a predetermined voltage is detected by the logic circuit 410 (stand-by mode), and to operate in the normal operation mode when loading a coordinate value (normal processing mode). Thus, not only the power consumption may be reduced at the touch panel section 401 of the coordinate input section during the stand-by mode, but also, the power consumption may be more reduced because the CPU 405 operates in the low power consumption mode.

Figure 6:
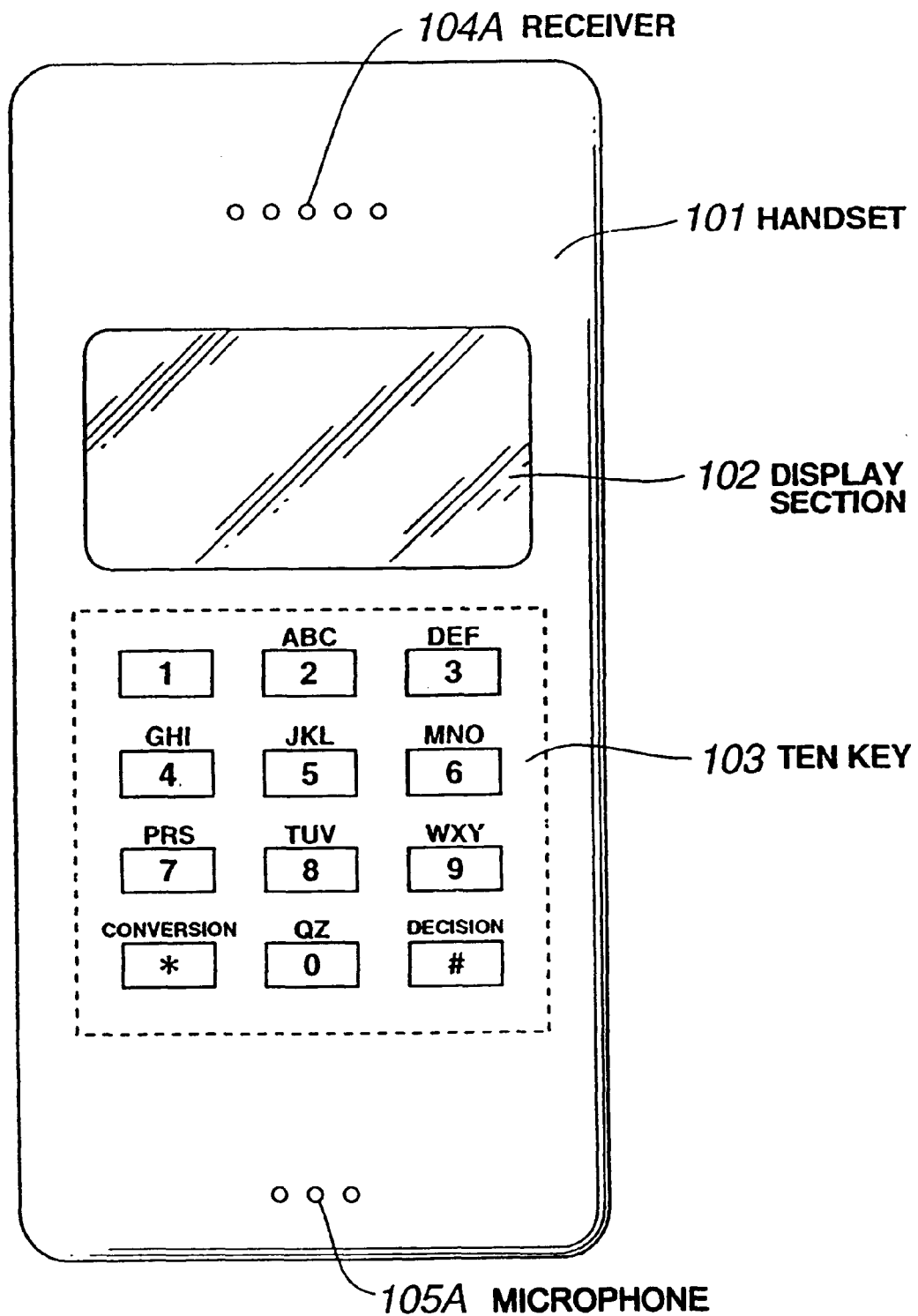
FIG. 6 is a front view of a cellular telephone to which the coordinate input device according to an embodiment of the invention is applied.

The coordinate input device composed as mentioned above may be applied to a cellular phone having the following character input function. FIG. 6 shows the front view of such a cellular phone. A handset 101 is composed of a rather flat rectangular parallelepipedal case, a ten key (dial key) 103 comprising keys in 4 rows 3 columns from the center to the bottom of the surface thereof and a display section 102 for displaying characters, symbols or other information at the top thereof. Above the display section 102, there is provided a receiver section 104A for listening to the transmitted voice, and below the ten key 103, there is provided a microphone section 105A for inputting the voice.

Figure 7:
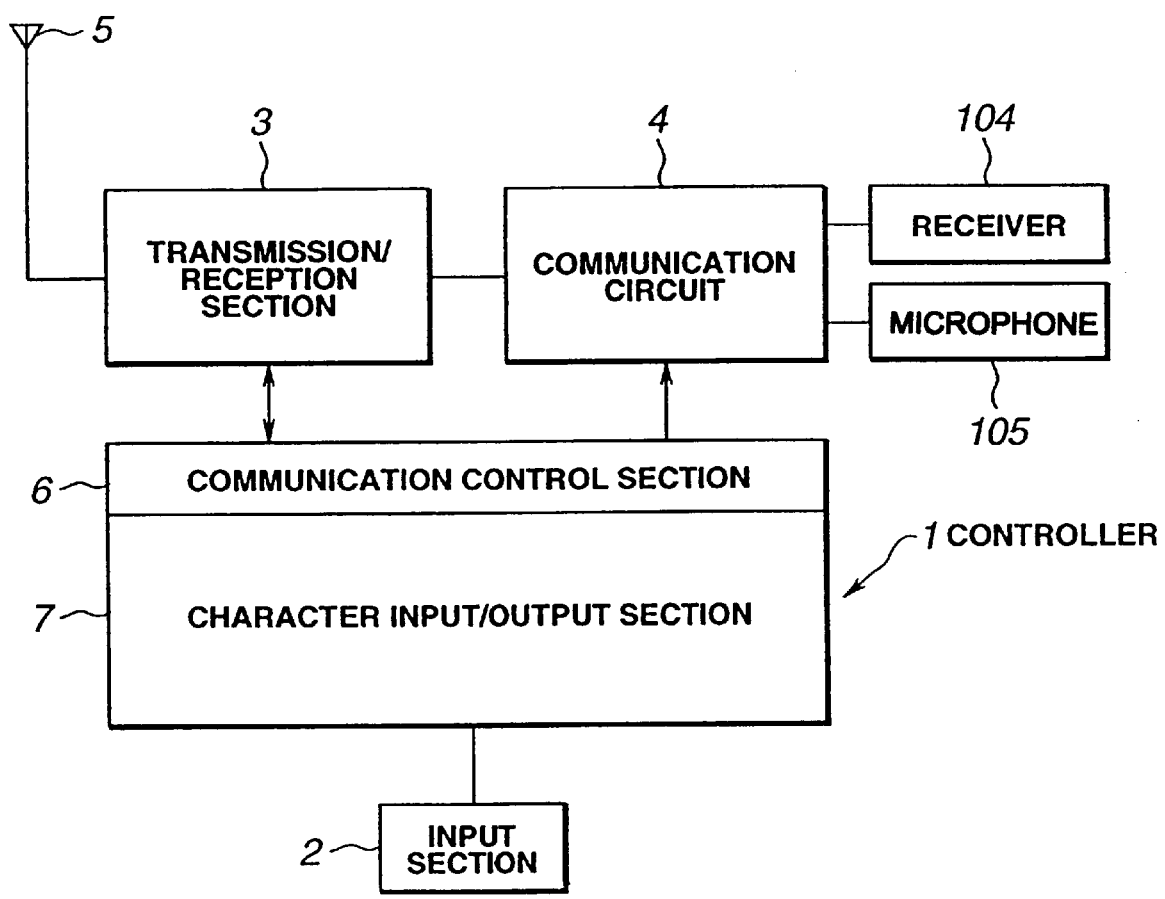
FIG. 7 is a composition diagram showing a cellular telephone to which the coordinate input device according to an embodiment of the invention is applied.

FIG. 7 illustrates the inner composition diagram of the aforementioned cellular telephone. The cellular telephone comprises a controller 1 for controlling respective parts, an input section 2 for entering information, an antenna 5 for transmitting/receiving a radio wave, a transmission/reception section 3 connected to the antenna 5 for transmitting/receiving signals and a communication circuit 4 for emitting/receiving voice signals between this transmission/reception section 3 and the receiver 104/microphone 105. The receiver 104 and microphone 105 correspond respectively to the receiver section 104A and microphone section 105A of FIG. 6. The controller 1 comprises a communication control section 6 for controlling the communication and a character input/output section 7 for processing character input/output according to the input from the input section 2. The communication control section 6 performs sending control in response to the input from the input section 2, call in control in response to call-accepted signal incoming through the antenna 5 and the transmission/reception section 3, amplitude adjustment in respect of the communication circuit 4 or other controls. Moreover, the communication control section 6 have functions to send through the transmission/reception section data transferred from the character input/output section 7 and to transfer the received data to the character input/output section 7. The input section 2 includes a mode selector switch for switching over between the operation mode as telephone and the operation mode as character input device. This mode selector switch may be a hook switch and, if a hook switch is employed, the operation mode as a character input device is selected during on-hook condition.

Figure 8:
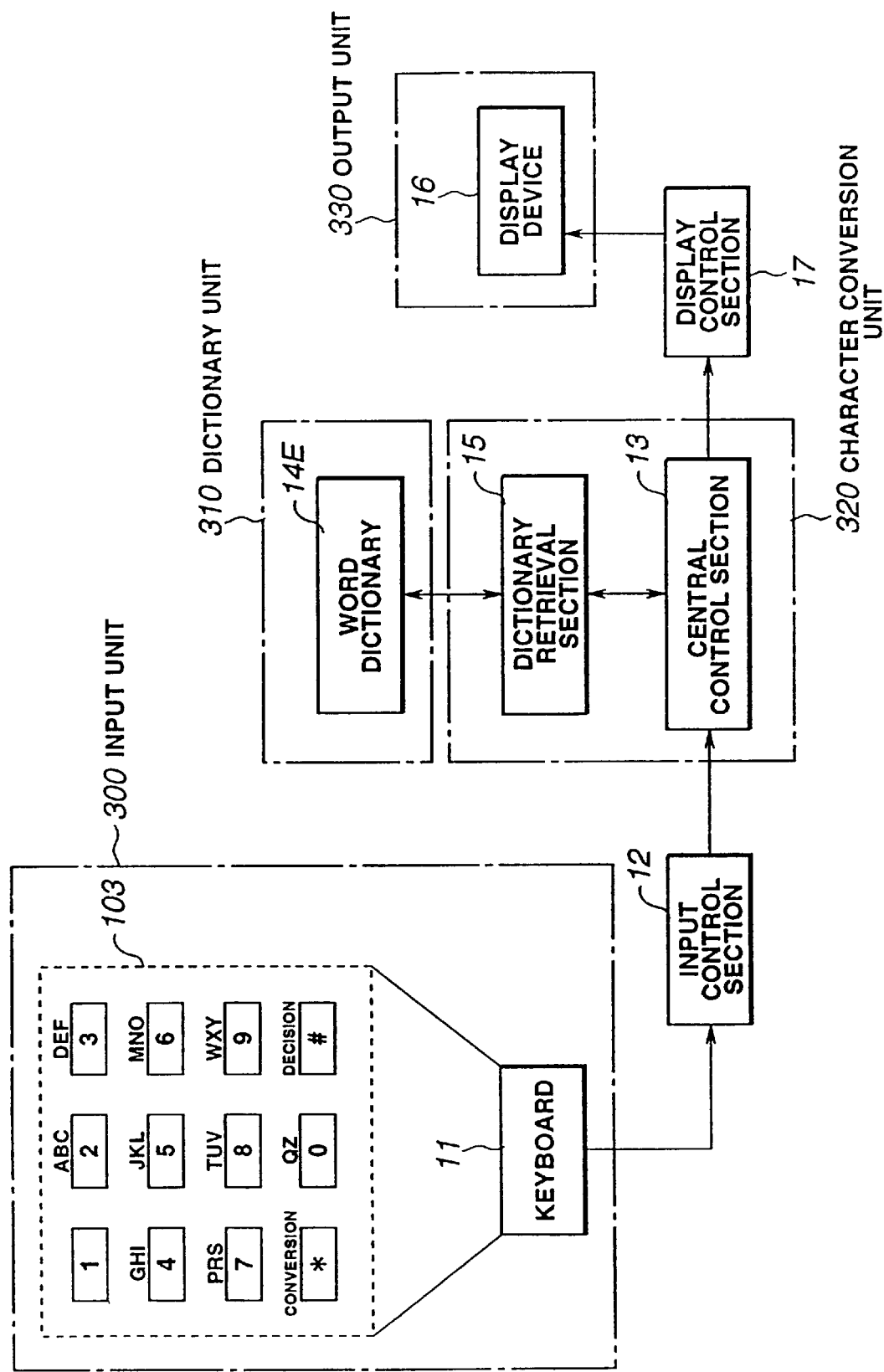
FIG. 8 is a composition diagram of a character input device to which the coordinate input device according to an embodiment of the invention is applied.

FIG. 8 is a composition diagram of the cellular telephone of FIG. 6 when it is put in the operation mode of character input device. This composition shows the portion comprising the input section 2 and the character input/output section 7 of FIG. 7. The character input device includes a keyboard 11 for entering characters or others, an input control section 12 for collection information of key operation on the keyboard 11 and for delivering to a central control section 13, a central control section 13 for integrally control respective sections of the character input device, a word dictionary 14E which is a dictionary means 310 storing the correspondence between input character or input character string and candidate character or candidate character string as the result of conversion, a dictionary retrieval section 15 for retrieving the corresponding candidate character or candidate character string referring to the word dictionary 14E concerning the input character or character string delivered from the central control section 13, a display device 16 comprising LCD or others for displaying characters or other information, and a display control section 17 candidate character string or others on the display device 16 under the control of the central control section. A plurality of alphabetic letters are distributed to respective numeric keys of the ten key 103 of the keyboard 11. Namely, in the usual dial key disposition, three letters, "A", "B" and "C" of the alphabet are allocated to the numeric key "2", three letters, "D", "E" and "F" of the alphabet are allocated to the numeric key "3" and so on up to the key "0". However, no letter is allocated to the key "1" or period, comma, apostrophe or other symbols. These and other symbols are allocated as mentioned below. To the key "0" are allocated "Q" and "Z". Moreover, "*" key is used as conversion key for directing conversion and retrieval of the next candidate, and "*" key is used as decision key for selecting and confirming the desired word when it is displayed. In the foregoing, the keyboard 11 comprises a plurality of keys to which a plurality of alphabetic letters is allocated, a conversion key for direction character conversion and a decision key for confirming the result of conversion so as to constitute an input unit 300. The display device 16 constitutes an output unit 330 for at least displaying and outputting candidate character or candidate character string as the result of conversion. The central control section 13 and the dictionary retrieval section 15 constitute a character conversion means 320 for obtaining candidate character or candidate character string through retrieval of the dictionary unit 310 in respect of a character corresponding to a key or of a plurality of characters corresponding to a plurality of keys entered from the input means 300, and for supplying the output means 330 with this candidate character or candidate character string.

Figure 9:
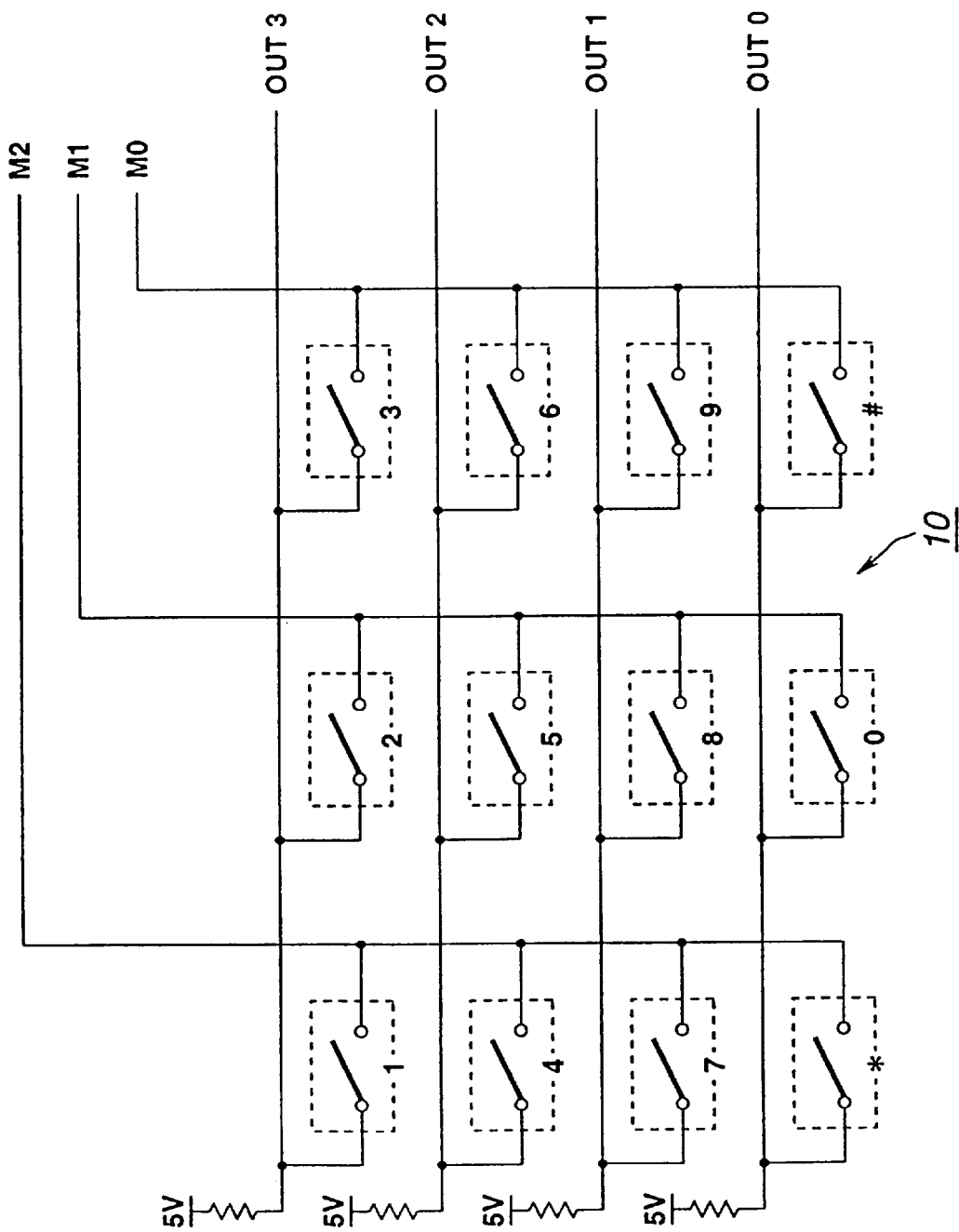
FIG. 9 is a composition diagram showing a key matrix portion, which is a part of the character input device shown in FIG. 8.

FIG. 9 is a composition diagram of the said keyboard 11. Each key of the ten key 103 is provided with a key matrix 10. One contact of each respective switch is constantly supplied with the power of 5 V via a pull-up resistor and a line Out 0–Out 3 along the row. The line Out 0–Out 3 along the row terminates at the control section 12. On the other hand, the other contact of the respective switch of the key matrix 10 is connected to the line M0–M2 along the column, and the line M0–M2 along the column terminates at the input control section.

Figures 10, 11:
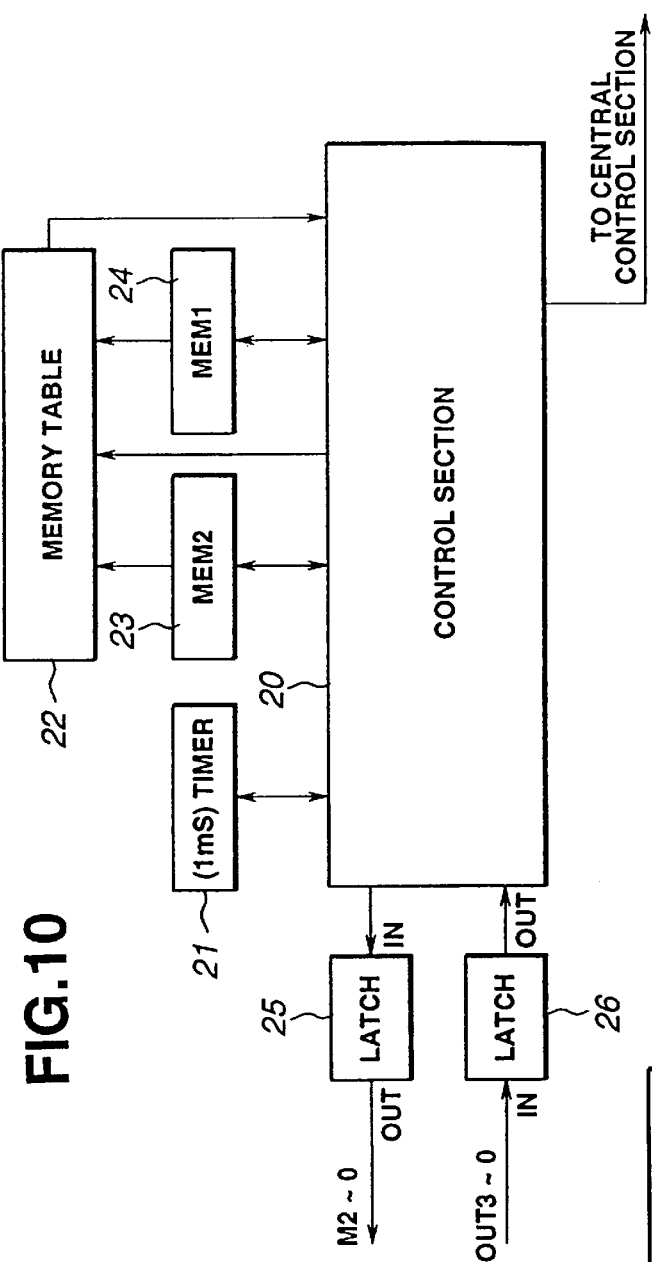
FIG. 10 is a composition diagram showing an input control section, which is a part of the character input device shown in FIG. 8.
FIG. 11 is a composition diagram showing a memory table included in the input control section, which is a part of the character input device shown in FIG. 8.

On the other hand, FIG. 10 is a composition diagram of the input control section 15. The input control section 12 comprises a control section for integral control, a timer 21, a memory table 22, a memory (MEM2) 23, a memory (MEM1) 24 and latches 25, 26. The latch 25 is a circuit for latching a drive signal to the line M0–M2 along the column supplied from the control section 20. The latch 26 is a circuit for taking and latching the signal of the line Out1–Out3 along the row. The timer 21 is arranged to remove chattering which appears during the key operation and to notify the control section 20 with predetermined time interval (1 millisecond) for the double reading of the key operation. The drive signal delivered to the latch 25 is set in the memory 23, while the detection signal held by the latch 26 at that time is set in the memory 24. The memory table 22 stores the data for specifying the operated key, whose content is shown in FIG. 11. In other words, when the data to be set in the memory 23 are respectively the set values "1", "2" and "3" of MEM2 as shown in FIG. 11, the 3 patterns arranged in rows making M2–M0 of 3 rows under MEM2 one set correspond respectively, showing that they are set in the latch 25. Therefore, when one of 3 patterns arranged in row making M2–M0 of 3 rows under MEM2 one set is set in the latch 25, one of numerals of the set value "1", "2" and "3" of MEM2 in FIG. 11 is set in the memory 23. One of 4 patterns making Out 0–Out 3 along right 4 rows of MEM1 in FIG. 11 one set is set in the latch 26 and this value is set in the memory 24. As a result, the numeral of the intersection one of 4 patterns of MEM1 in FIG. 11 and one of set values "1", "2" and "3" of MEM2 represent the numeral of the operated key. For instance, when "1" is set in the memory 23 and "1011" is set in the memory 24, the memory table 22 outputs a code representing "5" key. It shows that "(M2–M0)=101" is set in the latch 25.

The control section 20 reads the key according to the program of the flowchart shown in FIG. 12, so the operation of the control section will be described referring to this flowchart. First, the signal is latched by a latch 25 for outputting "0" to all of lines M0–M2 along the column (S1), then the appearance of "0" on any of lines Out0–Out 3 along the row based on the signal latched by a latch 26 (S2). When "0" appears, it waits 1 mS as determined by a timer 21 (S3). The signal of the lines Out 0–Out 3 in row direction is taken to be sent in a memory 24 (S4). It also comprises the steps of waiting 1 mS referring to the timer 21 (S5), taking the signal of lines Out 0–Out 3 in row direction from the latch 26 and detecting if it is equal to the content already set in the memory 24 (S6). Here, if it is not equal, the operation continues by returning to the step S2 while the result of the first and the second reads is identical, the signal "110(–M2M1M0)" is latched by the latch 25 for outputting "0" only to the line M0 in column direction, "0" is set in the memory 23 (S7) and it is detected where does "0" exist among the signals of lines Out–Out 3 in row direction latched by the latch 26 (S8). In other words, when "0" is delivered only to the line M0 in column direction of FIG. 9 is operated, "0" appears on one of signals of lines Out0–Out3 in row direction. Here, if "0" does not appear on any of signals of lines Out 0–Out 3 in row direction, the signal "101 " is latched by the latch 25 for outputting "0" only to the line M1 in column direction, "1" is set in the memory 23 (S9) and it is detected where does "0" exist among the signals of lines Out–Out3 in row direction latched by the latch 26 (S10). In other words, when "0" is delivered only to the line M1 in column direction, if one of 4 keys connected to the line M1 in column direction of FIG. 9 is operated, "0" appears on one of signals of lines Out0–Out3 in row direction. Here again, if "0" does not appear on any of signals of lines Out0–Out 3 in row direction, the signal "011" is latched by the latch 25 for outputting "0" only to the line M2 in column direction, "2" is set in the memory 23 (S11) and it is detected where does "0" exist among the signals of lines Out0–Out3 in row direction latched by the latch 26 (S12). In other words, when "0" is delivered only to the line M2 in column direction, if one of 4 keys connected to the line M2 in column direction of FIG. 9 is operated, "0" appears on one of signals of lines Out0–Out3 in row direction.

As the result of the aforementioned processing, in any case, if "0" does not appear on any of lines Out 0–Out 3 in row direction, the operation continues by returning to the step S1 while if "02" appears on any signal of lines Out0–Out3 in row direction in any of the said steps S8, S10 and S12, the signal of lines Out0–Out3 in row direction is taken from the latch 26 and set in the memory 24 (S13). Next, the control section 20 directs the memory table 22 to output. As a result, the memory table 22 is retrieved based on the signal set in memories 23, 24 (S14), and the code corresponding to the key output from the memory table 22 is delivered to the central control section 13. Then, the signal is latched by the latch 25 for delivering "0" to all of lines M0–M2 in column direction (S15). It is detected if all of lines Out0–Out3 in row direction become (return to) "1" (S16) and, if all "1's" are obtained, after waiting 1 mS after the detection referring to the timer 21 (S17), it is detected if all of lines Out0–Out3 in row direction become (return to) "1" (S18) and, if all "1's" are obtained, the operation continues by returning to the step S1. Thus, a code showing which key of the ten key 103 is operated (for instance, a code corresponding to a numeral) is delivered to the central control section 13.

Figure 13:
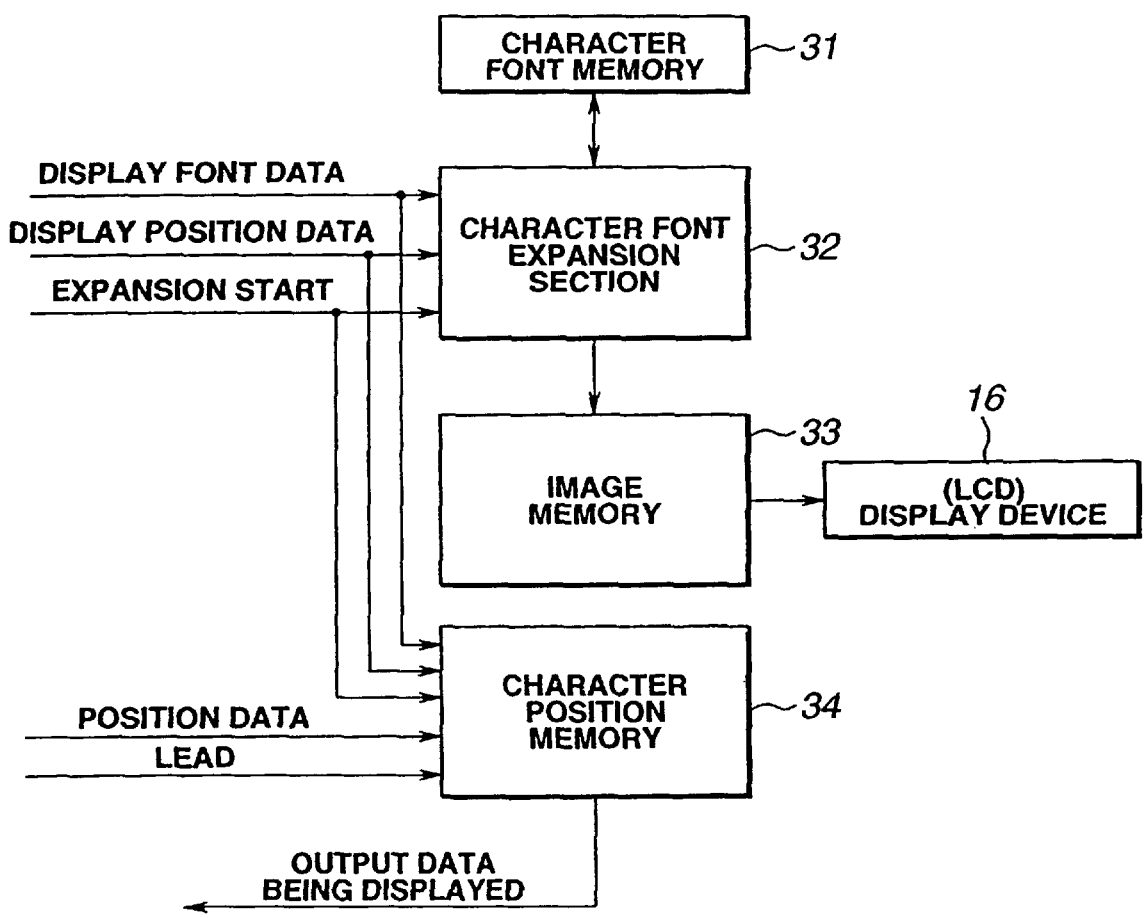
FIG. 13 is a composition diagram showing a display control section, which is a part of the character input device shown in FIG. 8.

FIG. 13 is a detailed composition diagram of the display control section 17 of the character input device. The display control section 17 comprises a character font memory 31 storing character font (character pattern), a character font expansion section 32 for expanding this font stored in the character font memory in an image memory 33 under the control of the central control section 13, an image (bit map) memory 33 for holding by bit map the image data to be displayed on an (LCD) display device 16 and a character position memory 34 for storing the display font data (character code) being displayed with the display position.

The said display control section 17 is supplied with display font data, display position data, expansion start instruction signal and position data (address) of the character position memory 34 from the central control section 13. Namely, when the display font data is delivered with the expansion start instruction signal, the character font expansion section 32 accesses the character font memory 31 to retrieve the display font corresponding to the delivered display font data and stores in the corresponding position of the image memory 33 based on the display position data (coordinates of the image memory 33). As the result, the data position of the image memory 33 corresponding in one-to-one relation to the pixel of the image of LCD display device 16, the pixel data of the display font expanded at the concerned position will be memorized. On the other hand, the character position memory 34 stores the display font data and the display position data at the location of the position data delivered from the central control section 13. As the central control section 13 can read it by unit of a lead signal, it can read the data being displayed (display font data) with its display position data and transmit to the other terminal via the communication control section 6, the transmission/reception section 3 and the antenna 5 of the FIG. 7, or perform other processing.

Figure 14:
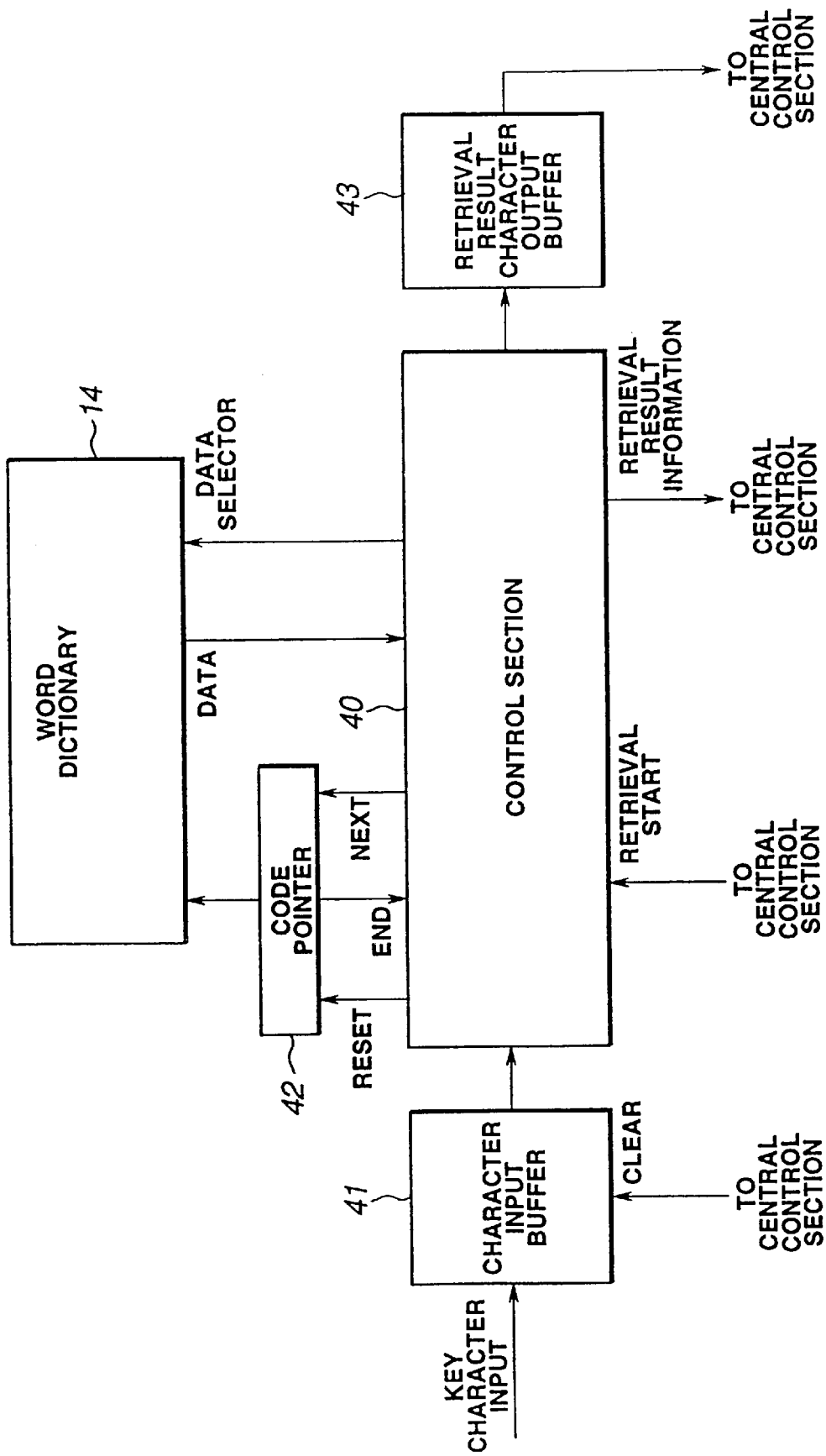
FIG. 14 is a composition diagram showing a dictionary retrieval section, which is a part of the character input device shown in FIG. 8.

FIG. 14 is a detailed composition diagram of the dictionary retrieval section 15 of the said character input device. The dictionary retrieval section 15 comprises a control section 40 for integrally controlling the entire dictionary retrieval section 15, a character input buffer 41 for storing character or character string entered from the key, a code pointer 42 used for the dictionary retrieval of the word dictionary 14E and a retrieval result character output buffer 43 for holding codes of a candidate character or character string obtained by the dictionary retrieval.

Figures 15, 16:
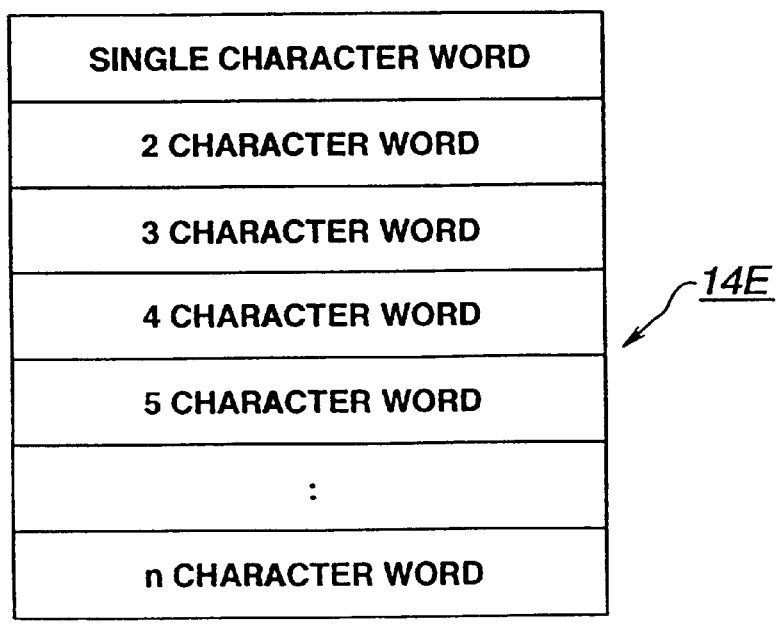
FIG. 15 is a schematic diagram showing a dictionary, which is a part of the character input device shown in FIG. 8.
FIG. 16 is a concrete composition diagram showing the dictionary, which is a part of the character input device shown in FIG. 8.
Figure 17:
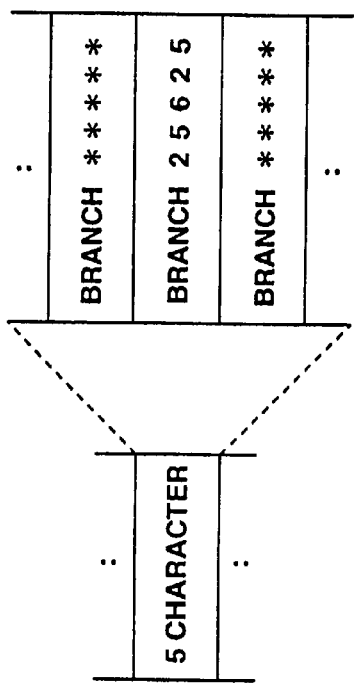
FIG. 17 is a concrete composition diagram showing the dictionary, which is a part of the character input device shown in FIG. 8.
Figure 18:
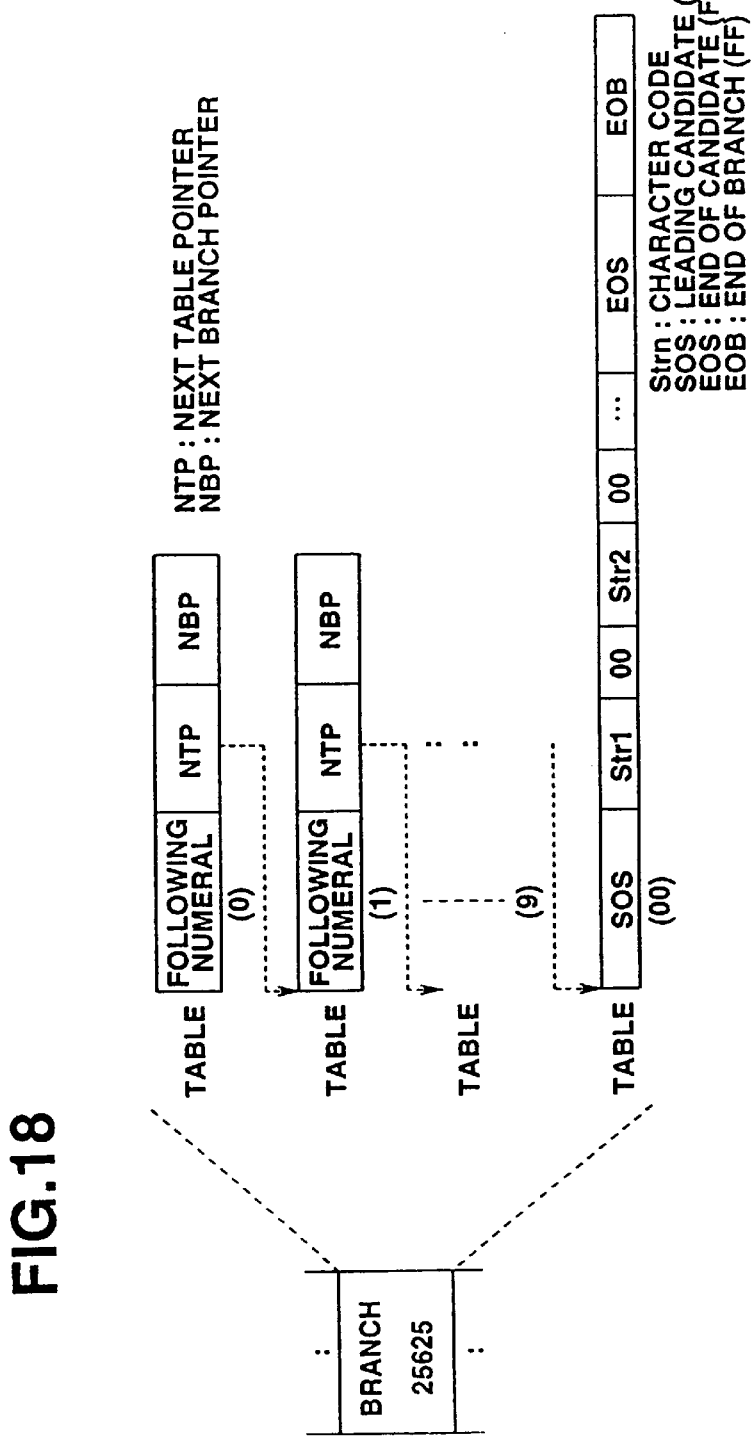
FIG. 18 is a concrete composition diagram showing the dictionary, which is a part of the character input device shown in FIG. 8.

FIG. 15 shows the content memorized in the word dictionary 14E. Namely, in correspondence to the numeric code by the operation of the ten key 103, dictionary information comprising an alphabetic character or character string (word), property information including article, location, time and other information are stored in correspondence at each other. To be more specific, the word dictionary 14E is composed as shown in FIG. 16 to FIG. 18. First, the word dictionary 14E is composed of blocks divides into character number unit as shown in FIG. 16. As shown in FIG. 17, the block corresponding to respective number of characters is composed of a plurality of branches corresponding to numeric string of the concerned number of characters. Here, a plurality of branches corresponding to numeric strings of 5 characters exists in the block of 5 characters and the branch corresponding to the numeric string "25625" among them is shown explicitly while the specific numeral is shown by "*" in other branches. Moreover, FIG. 18 shows the content of the branch corresponding to the numeric string "25625". The branch contains tables corresponding to the following numerals (0) to (9) if they exist (two tables if only (1) and (8) exist as the following numeral) and a table corresponding to SOS(00) indicating the leading candidate corresponding to the numeric string when there is no following numeral. The table corresponding to the following numerals (0) to (9) contains corresponding following numerals, a pointer NTP of the next table and a pointer NBP of the next branch in set. On the other hand, the table corresponding to SOS (00) contains a code SOS(00) indicating the leading candidate of the case when no following numeral exist (corresponding to the numeric string "25625" in this case), a character or character string code Str1–Strn (represent n candidates by character code from 1 to n), a code EOS (FF) indicating the end of candidate character or candidate character string code and a code EOB (FF) indicating the end of the branch in set. If a plurality of candidates exist, the code SOS(00) is registered also between respective ones of the plurality of candidates. If the property information should be memorized, it is set after the character code Str1–Strn of the respective candidate with a symbol indicating th e property information.

If a plurality of candidate character or candidate character string exist as mentioned above, it is because a plurality of alphabetic letters are allocated to a single key. For instance, when "6" key is operated and then "6" key is operated, as "6" key corresponds to "M", "N" and "O", among string inputs by the combination of any of "M", "N" and "O" corresponding to the first operation of "6" key and any of "M", "N" and "O" corresponding to the next operation of "6" key, as meaningful candidate character strings, words "on", "no" or others exist. While for the numeric string "25625" shown as example in FIG. 18, as meaningful words, "clock", "block" or others exist. In the present invention, it is adopted a method wherein the input is made by sequentially operating the key to which the desired character is allocated among a plurality of keys to which a plurality of characters are allocated respectively. The strings are composed by selecting any one character corresponding to the respective key operation among a plurality of characters generated by the respective key operation through this input. These strings are memorized in the word dictionary 14E as correlated with the key name (for instance, in corresponding with numeral string if it is numeric key). The dictionary is retrieved based on the string be the name of the operated key for obtaining a character or character string (word).

Figure 19:
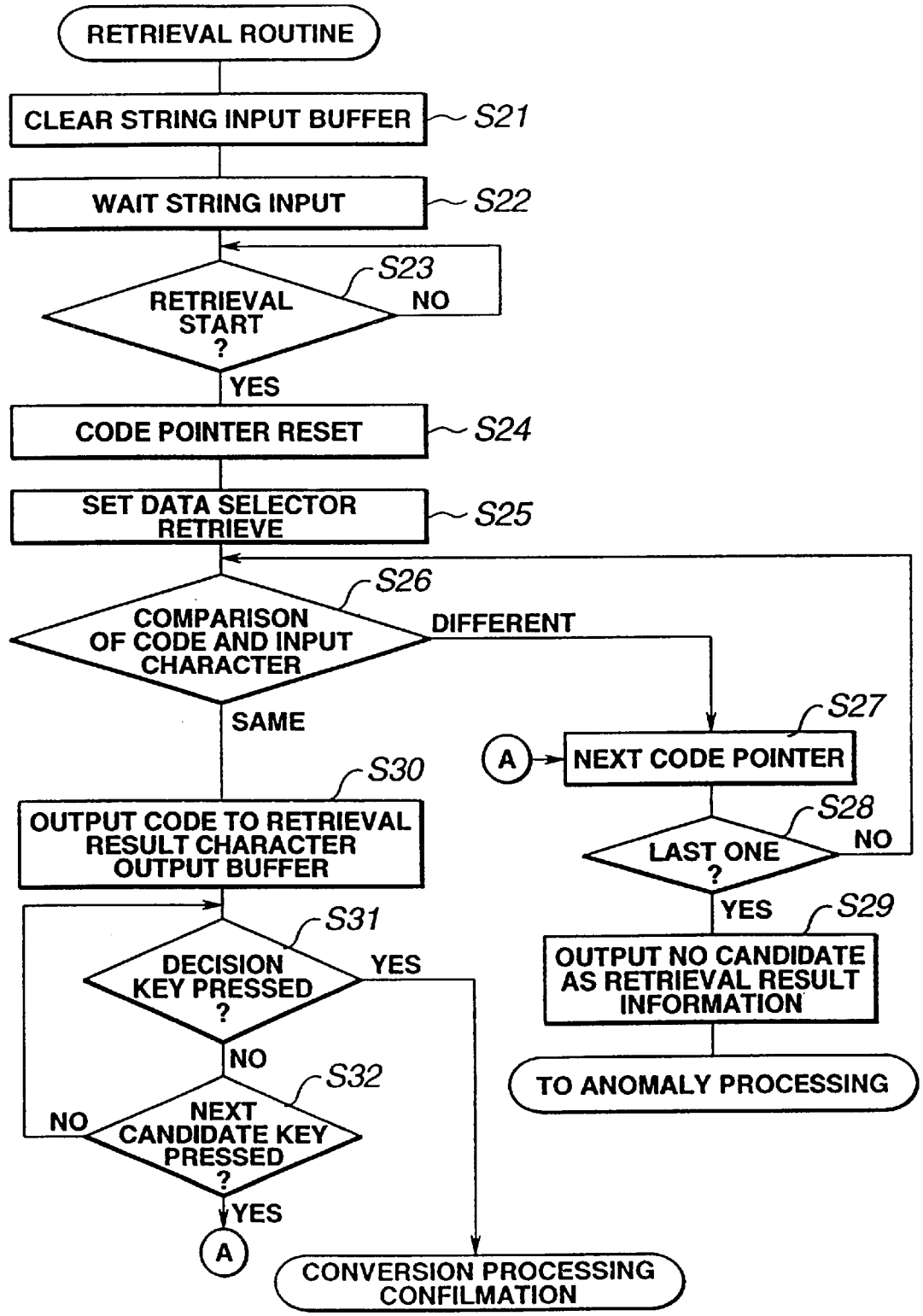
FIG. 19 is a flowchart for illustrating the operation of the dictionary retrieval section, which is a part of the character input device shown in FIG. 8.

The control section 40 of the word dictionary 14E shown in FIG. 14 processing the retrieval of the word dictionary 14E according to the program of the flowchart shown in FIG. 19, the operation of the control section 40 will be described according to this flowchart. The control section 40 clears a character input buffer 41 (S21) and waits for the arrival of the code of input character or input character string (code of numeric key) (S22). In this example, the operator wants to enter "clock" as input character as shown in ST1 in FIG. 20. There, the operator operates the corresponding key of the ten keys of a cellular telephone. Different from the ten key 103 of FIG. 6, alphabetic letters are indicated directly on the rounded key top of the ten key 103 in FIG. 20. This shows that an appropriate input can be made both by the ten key 103 in the form of FIG. 6 or this ten key 103 of FIG. 20 for this character input device. The numeric key of the ten key 103 is operated "25625" as shown by ST2 in FIG. 20. It is shown that the operator made input desiring the encircled word "clock" among alphabetic letters corresponding to "25625" of ST2.

Figure 12:
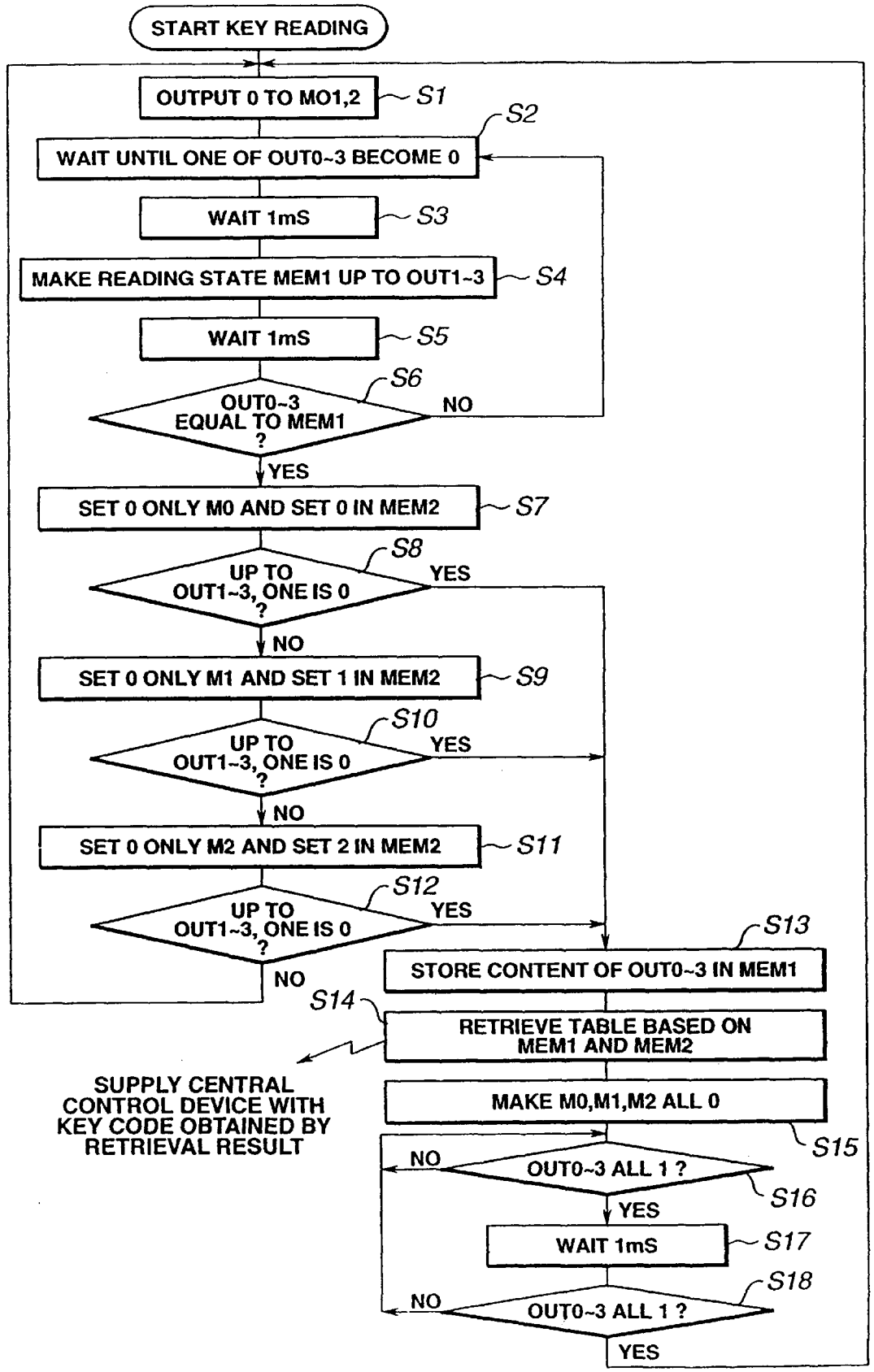
FIG. 12 is a flowchart for illustrating the operation of the input control section, which is a part of the character input device shown in FIG. 8.

Then, by the operation of the input control section 12 described for FIG. 12, a code corresponding to the operated numeric key is obtained and a code string corresponding to the said "25625" is stored in the character input buffer 41.

Figure 20:
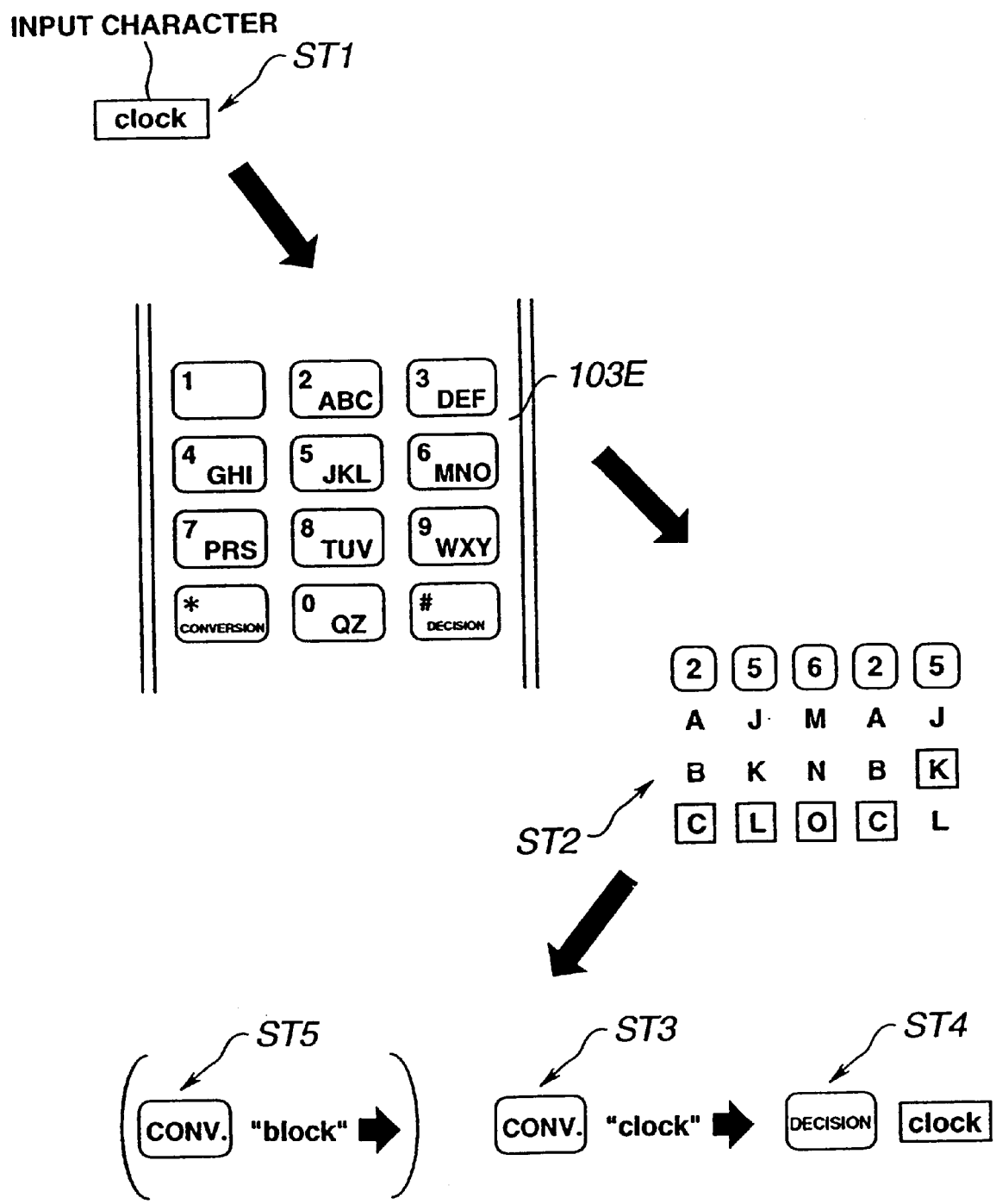
FIG. 20 is a diagram for illustrating the input operation using the character input device shown in FIG. 8.

Next, the operator presses "*", key, that is conversion/next candidate key for conversion as shown by ST3 in FIG. 20. The operation of this "*" is also converted into a code by the operation of the input control section 12 described for FIG. 12 and then delivered to the central section 13. On reception, the central control section 13 transmits a retrieval start signal to the central control section 40 of FIG. 14. There, as shown in FIG. 19, the control section 40 monitoring the retrieval start (S23) resets a code pointer 42 (S24) and puts a data selector signal in set state (S25). Next, the control section 40 takes out codes stored in the character input buffer 41 from the beginning and start the retrieval from the block of single character of the word dictionary 14E. The retrieval procedure is identical for any number, so the description will begin with the retrieval in the block of 3 characters.

Figure 21:
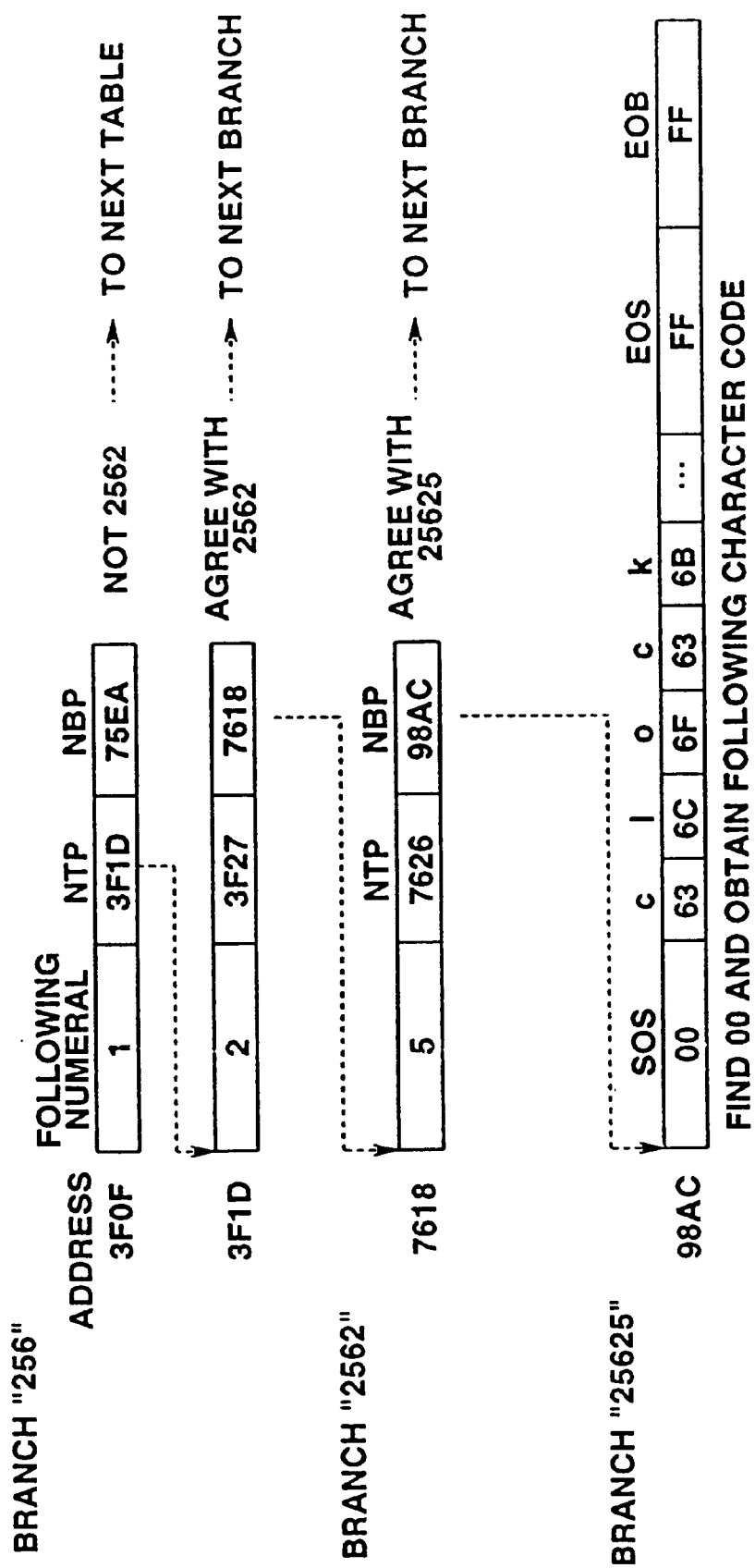
FIG. 21 is a diagram for illustrating the dictionary retrieval by the input operation using the character input device shown in FIG. 8.

FIG. 21 is a diagram for illustrating the processing from the retrieval in the block of 3 characters. It arrives at the table of the address "3F0F" of the block of 3 characters in response to the numeric string "256". The following number in this table is "1" and different from the fourth number "2" of the numeric string "25625" stored in the character input buffer 41, so the next table will be retrieved based on NTP. Here exists only a candidate with the numeral "1" following the numeric string "526" and a candidate with "2". Usually, tables of following numerals as much as they exist such as table with the following numeral "1", then table with the following numeral "2", then table with the following numeral "3" and so on before arriving at the table of the required following numeral.

When the following numeral agrees, it arrives at the first table of the branch "2562" of 4 characters based on NBP of this table. In this table, as the following numeral is "5", it agrees with the fifth numeral "5" of the numeric string "25625" stored in the character input buffer 41. When the following numeral agrees, it arrives at the next branch "25625" based on NBP of this table. Here, originally, as there is no following numeral stored in the character input buffer 41, it retrieves a table wherein "00" is set in the area of following numeral. In this example of FIG. 21, it is supposed there is no candidate having a numeral following the numeric string "25625" even in the word dictionary 14E or no table, it arrives from the table of the branch "2562" directly to the table of the address "98AC" where "00(–SOS)" is set in the area of following numeral.

In the example of FIG. 21, as "clock" is set by code "63, 6C, 6F, 63, 6B" in the first candidate character string, the code "63, 6C, 6F, 63, 6B" of the concerned "clock" is read in response to the output value "0" of the code pointer 42. The aforementioned processing corresponds with the processing from "Retrieval" (S25) to the loop (S26, S27, S28) in FIG. 19. The increment of the code pointer 42 in the step 27 corresponds to the sequential table retrieval in FIG. 21 and, at the same time, to the read-out by specifying respective candidate character in the target table. Therefore, in practice, the retrieval of candidate character made in FIG. 21 is equivalent to the retrieval of the word dictionary 14E shown in FIG. 15. In this example "clock" is obtained. However, if a candidate character corresponding to the entered numeric string does not store in the word dictionary 14E, the value is increased by supplying the code pointer 42 with NEXT signal (S27), the loop from S28 to S26 is reiterated and eventually, if candidate character or candidate character string cannot be retrieved, it branches to YES at S28. In other words, END signal is returned from the code pointer 42. There, the control section 40 transmits "No candidate" as retrieval result information to the central control section 13. Receiving this "No candidate," the central control section 13 supplies the display control section 17 with character font "No candidate" for displaying that no candidate exists by means of LCD display device 16 (S29).

The code of "clock" obtained as mentioned above is transmitted to the retrieval result character output buffer 43 (S30). Based on the retrieval result information, the central control section 13 is notified with the result output, the code of "clock" is taken into the central control section 13 from the retrieval result character output buffer 43, transmitted to the display control section 17 and then delivered to the (LCD) display device 16 for visualization as described for FIG. 13. Namely "clock" is displayed on the (LCD) display device 16. The control section 40 of the word dictionary 14E monitors the operation of the decision key or the next candidate key (S31, S32). The operation of the decision key or the next candidate key is transmitted from the input control section 12 to the central control section 13 as in the operation of the aforementioned conversion key.

Figure 22:
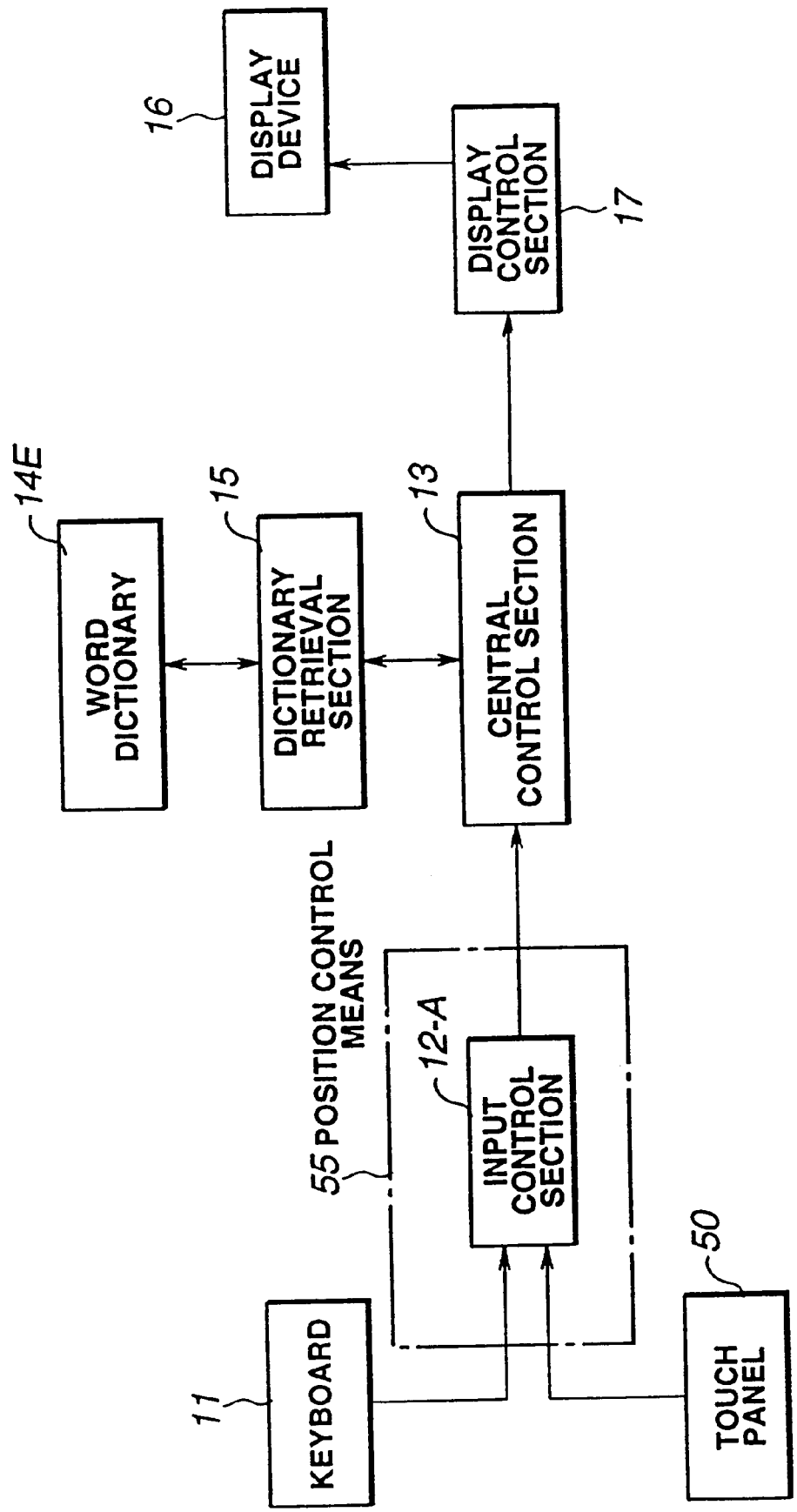
FIG. 22 is a composition diagram of a character input device composed by applying the coordinate input device according to an embodiment of the invention.

In the example of FIG. 20, as "clock" is the desired character, the decision key is pressed as shown in ST4. Receiving the code of the decision key, the central control section 13 shifts the retrieval signal to inactive. Receiving this, the control section 40 of the dictionary retrieval section 15 branches to YES from the step 31 for confirming the said candidate character. When first "block" and then "clock" are stored in the word dictionary 14E in correspondence with "25625", first "block" is displayed as shown in parentheses at ST5 in FIG. 20, the next candidate key is operated in response to this, the value of the code pointer 42 is increased by receiving NEXT signal (S27), the code of the next candidate "clock" is obtained for proceeding from S26 to S30. In this case also, as "clock" is the intended word, the decision key is pressed as shown in ST4. The further processing is as shown above. FIG. 22 is a partial composition diagram concerning the character input function of the coordinate input device according to an embodiment of the invention applied to a cellular telephone described above. In this composition portion for character input, a touch panel 50 (corresponding to the touch panel section 401 of FIG. 1) is disposed by attaching the screen of a display device 16 and an input control section 12-A detects the operation input coordinates value from this touch panel 50. Namely, a coordinate input section composed of a touch panel section 101 as described for FIG. 3 and FIG. 4 is attached to the screen of a display section 102 corresponding to the display device 16. As described for FIG. 1 and FIG. 2, in response to the coordinate input on this coordinate input section, the input control section 12-A detects disposed in the case of a cellular telephone the position (coordinates) of the operation. In other words, the input control section 12-A comprises the composition other than the touch panel of the coordinate input device according to an embodiment of the present invention and constitutes a position detection means 55 for detecting the input operation position on the touch panel 50 of FIG. 22.

Figure 23:
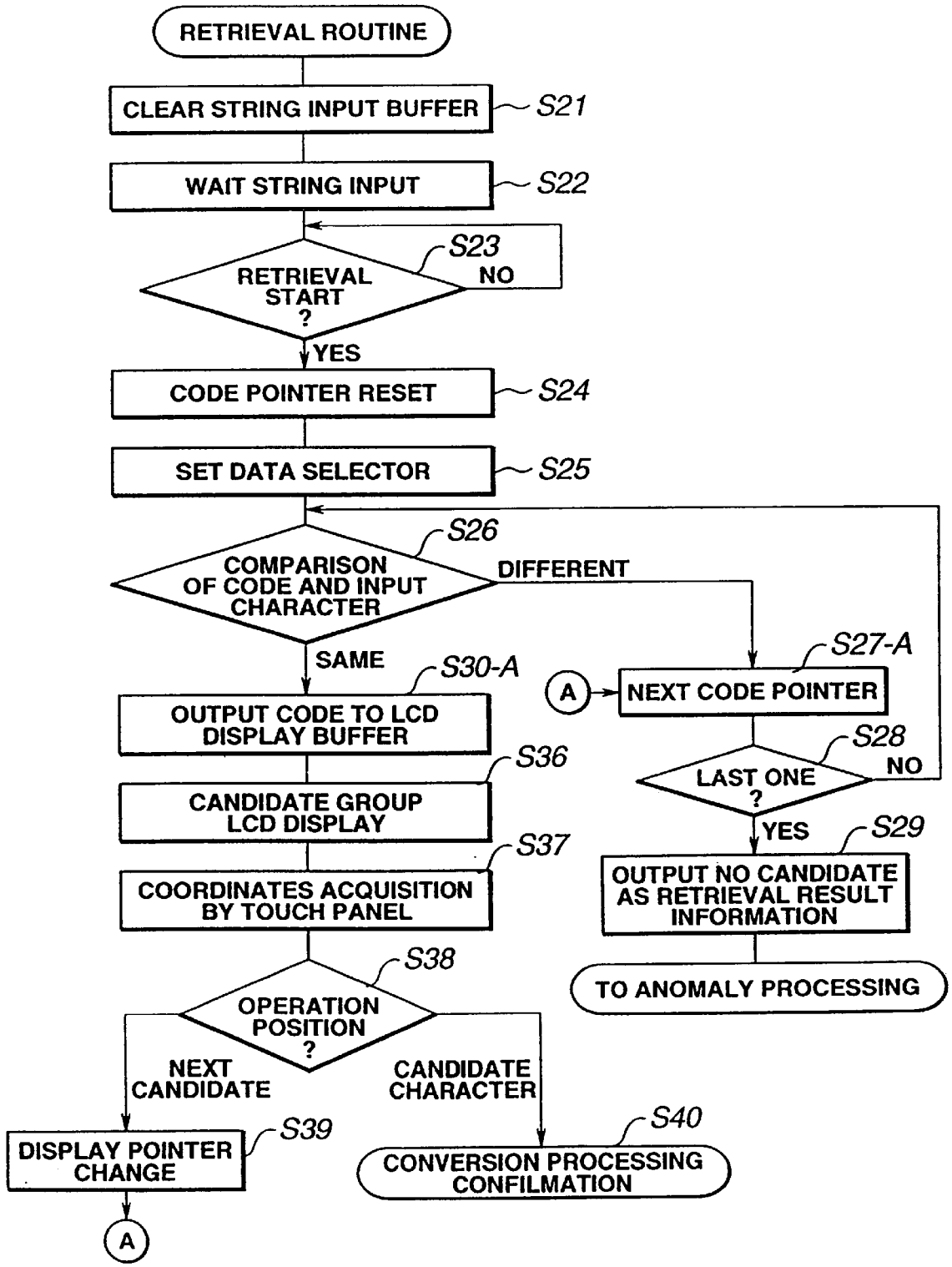
FIG. 23 is a flowchart for illustrating the operation of the dictionary retrieval section, which is a part of a character input device composed by applying the coordinate input device according to an embodiment of the invention.

FIG. 23 is a flowchart for illustrating the operation of the dictionary retrieval section 40 of the dictionary retrieval section 15 of a character input device composed as shown in said FIG. 22. In this embodiment, the processing corresponding to the steps S30–S32, S27 of FIG. 14 performed by character input device of the composition as mentioned above will be executed as show in FIG. 23. That is to say, a predetermined number of candidates, as existing, from the word dictionary 14E and supplied to a character output (for LCD display) buffer 43 with "next candidate" character (or "scroll") (S30-A). In response to this, if a numeric string "227" is input and the conversion key is operated, the display control section 17 displays "bar", "cap", "car", "next candidate" at the position of the transparent electrode 52 of the display screen of the display section 102 as shown at the bottom the FIG. 25. The control section detects the operation position on the touch panel 50 (S37), detects the candidate character displayed in correspondence with the coordinates of the operation position (S38) and confirms this candidate character (S40).

Figures 24, 25:
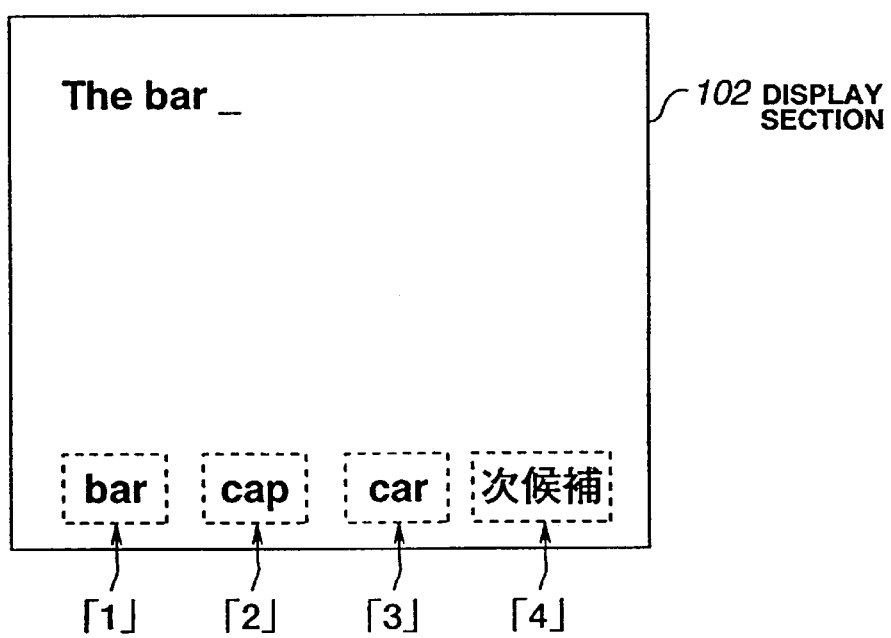
FIG. 24 is a composition diagram of a memory table included in the dictionary retrieval section, which is a part of the character input device shown in FIG. 23.
FIG. 25 is a diagram illustrating a display example of a character input device composed by applying the coordinate input device according to an embodiment of the invention.
Figure 26:
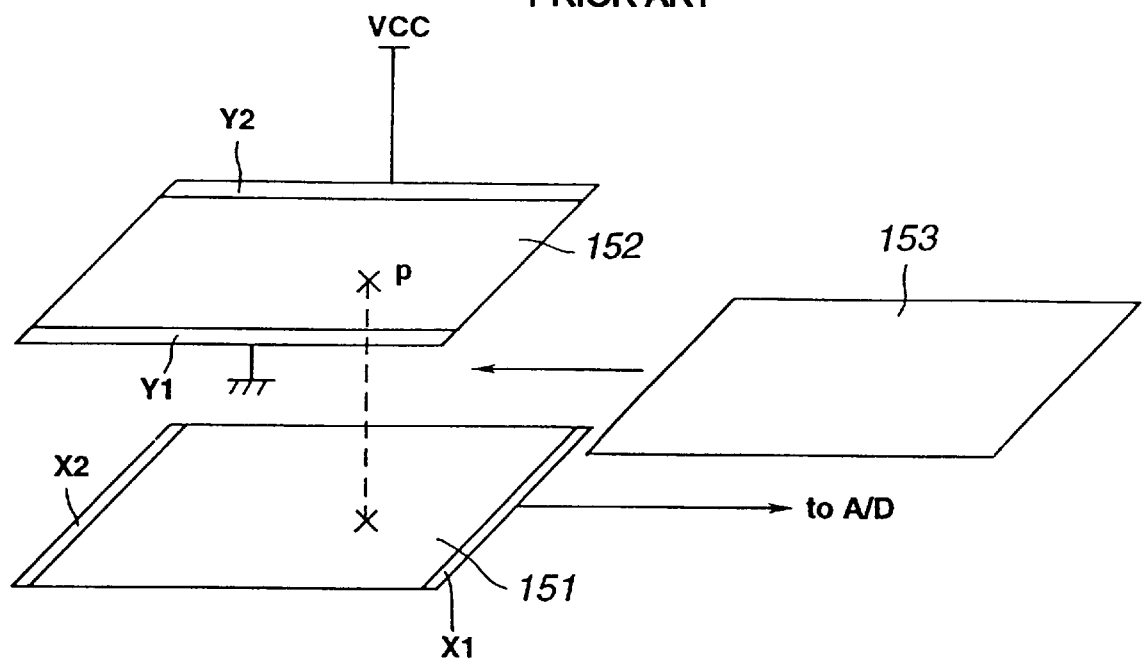
FIG. 26 is a composition diagram showing the coordinate input section of a coordinate input device according to the prior art.
Figure 27:
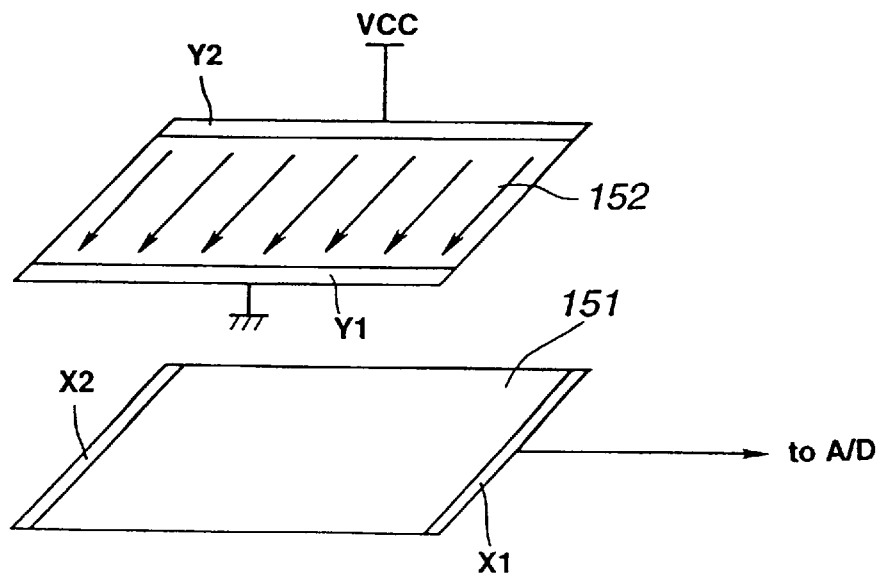
FIG. 27 is a composition diagram showing the stand-by mode of the coordinate input section of a coordinate input device according to the prior art.
Figure 28:
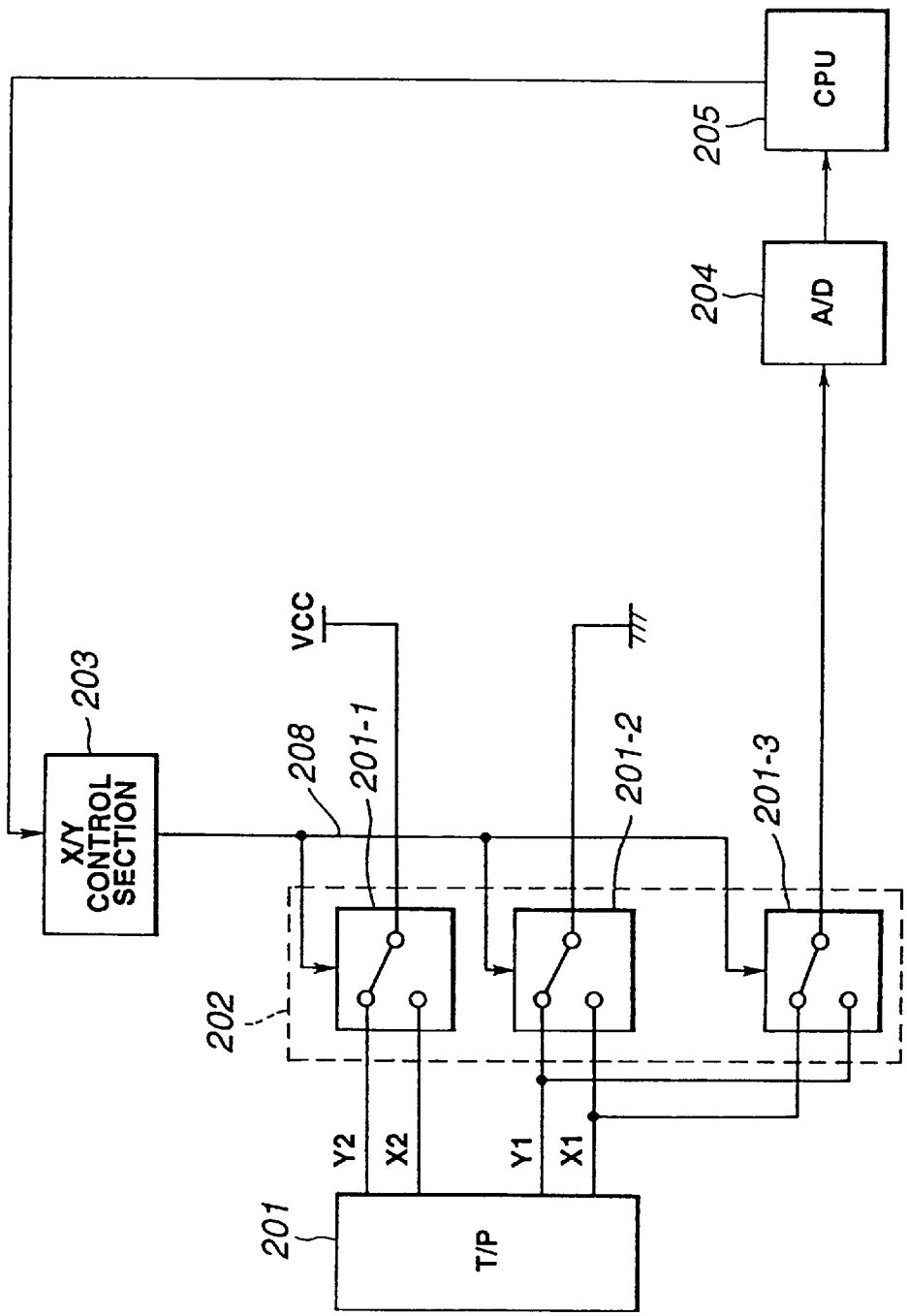
FIG. 28 is a composition diagram of a coordinate input device according to the prior art.

Now, the detail of the processing concerning the detection of the operation position on the touch panel 50 and the detection of the candidate character displayed in correspondence with the coordinates of the operation position assumed by the control section 40 will be described. The control section 40 is supplied with coordinate values concerning the input operation on the touch panel from the input control section 12-A including essential parts of the coordinate input device according to an embodiment of the present invention. The control section 40 includes, as shown in FIG. 24, a table for confronting said coordinates (x, y) and the candidate character or string, and the region number of the "next candidate" string, so, for instance, when coordinates (xi, yi) are obtained, the region number "2" will be detected. As shown in FIG. 25, from the left, candidate number "1", "2", "3" and "4" are allocated to the code of candidate character or string and to the code of "next candidate" in correspondence with the region number. The control section 40 holds also information about the correspondence of candidate numbers with the code of candidates (including code of "next candidate") delivered to the display control section 17 (that is, candidates being displayed). Therefore, when the display control section 17 is supplied with candidates as shown in FIG. 25 and the coordinate values (for instance, xi, yi) corresponding to the region number "2" is obtained, it may be detected that the candidate having the candidate number "2" is selected, namely, "cap" is selected.

On the other hand, the operation of the next key (or the region of "next candidate") is detected at the step S38 of said FIG. 23; the pointer for display changes (S39), and the code pointer 42 is incremented by said predetermined number of candidate (by 3 in the example of said FIG. 25) (S27-A) before proceeding to the retrieval of other candidates. In other words, when the pointer for displaying candidates for candidate string of the corresponding table of the word dictionary 14E and the pointer for retrieving candidate characters form within the table of the word dictionary 14E are common, by incrementing them by 3, next 3 candidates are taken out, if they exist, and displayed. Thus, a cellular telephone adopting the coordinate input device according to an embodiment of the present invention may display simultaneously a plurality of candidates if they exist and select by the touch panel 50 so as to allow advantageously to confirm the candidate character surely and rapidly, it goes without saying that it can effectively reduce the power consumption of the cellular telephone.

What we claim is:

1. A coordinate input device comprising:
   a coordinate input section wherein a first conductive sheet for x-coordinate detection provided with electrodes on a pair of end edges and a second conductive sheet for y-coordinate detection provided with electrodes on a pair of end edges are superposed through a spacer so that respective pairs of electrodes intersect orthogonally with each other;
   an A/D converter for converting the signal from either of said first and second conductive sheets into a digital coordinate value;
   a processor connected to the A/D converter;
   a logic circuit different from the processor and connected to the processor for detecting variation of a predetermined voltage while the predetermined voltage is applied between one of said electrodes of said first conductive sheet and one of said electrodes of said second conductive sheet, the logic circuit generating an interrupt signal separate from an output of the A/D converter responsive to detecting the variation of the predetermined voltage, the logic circuit comprising a first inverter and a second inverter connected in series, each of said first and second inverters having an input and an output, the input of said first inverter configured to receive the variation in the predetermined voltage and the output of said second inverter configured to generate the interrupt signal,
   wherein the processor is configured to accept the digital coordinate value from said A/D converter in response to receiving the interrupt signal from said logic circuit.

2. The coordinate input device of claim 1, wherein said first conductive sheet, said second conductive sheet and said spacer are transparent.

3. The coordinate input device of claim 2, wherein said coordinate input section is arranged on a screen of a display device.

4. The coordinate input device of claim 2, wherein the coordinate input section is disposed on a screen of a cellular telephone display.

5. The coordinate input device of claim 1, wherein said spacer insulates between said first and second conductive sheets in a normal state.

6. The coordinate input device of claim 5, wherein said spacer comprises an aeolotropic conductive rubber sheet.

7. The coordinate input device of claim 5, wherein said spacer comprises a lattice member.

8. The coordinate input device of claim 5, wherein said spacer comprises a perforated sheet.

9. The coordinate input device of claim 1, wherein each of said first and second inverters is a Schmidt trigger type inverter.

10. The coordinate input device of claim 1, further including a pull-up resistor with the predetermined voltage being applied at one end of the resistor, wherein the input of the first inverter is connected to the other end of said pull-up resistor.

11. The coordinate input device of claim 10, further including a first switch responsive to said processor, the input of said first inverter being further connected to either said coordinate input section or an open circuit, depending upon a position of said first switch.

12. The coordinate input device of claim 11, further including a second switch responsive to said processor, wherein when the position of said first switch is such that the input of said first inverter is connected to said coordinate input section, the input of said first inverter is connected to either one of the pair of electrodes of said first conductive sheet or one of the pair of electrodes of said second conductive sheet, depending upon a position of said second switch.

13. A coordinate input device comprising:
   a coordinate input section wherein a first conductive sheet for x-coordinate detection provided with electrodes on a pair of end edges and a second conductive sheet for y-coordinate detection provided with electrodes on a pair of end edges are superposed through a spacer so that respective electrodes intersect orthogonally;
   selection means for selecting a signal from either of said first and second conductive sheets;

an A/D converter for converting the signal from said selection means into a digital coordinate value signal representing at least a coordinate value of a point selected on said coordinate input section;

a processor for loading the coordinate value from the digital coordinate value signal from said A/D converter;

a stand-by control section for switching, responsive to said processor, between applying a first predetermined voltage between said both electrodes of said first conductive sheet or between said both electrodes of said second conductive sheet and for applying a second predetermined voltage between one of said electrodes of said first conductive sheet and one of said electrodes of said second conductive sheet;

a logic circuit different from said processor for detecting, responsive to said stand-by control section, a variation in the second predetermined voltage at an input of the logic circuit when the second predetermined voltage is applied between one of said electrodes of said first conductive sheet and one of said electrodes of said second conductive sheet, and for generating an output separate from said digital coordinate value signal in response to detecting the variation in the second predetermined voltage; and a first switch responsive to said processor, the input of the logic circuit being connected to either the coordinate input section or to an open circuit, depending upon a position of said first switch, wherein said processor is configured to shift to a mode for loading the coordinate value from the digital coordinate value signal via said A/D converter in response to receiving the output of said logic circuit.

14. The coordinate input device according to claim 13, wherein said processor directs said stand-by control section to apply the second predetermined voltage between one of said electrodes of said first conductive sheet and one of said electrodes of said second conductive sheet responsive to no coordinate value being inputted over a predetermined period of time.

15. The coordinate input device according to claim 13, wherein said processor directs said stand-by control section to apply the second predetermined voltage between said pair of said electrodes of said first conductive sheet or said pair of said electrodes of said second conductive sheet, while the logic circuit monitors the variation in the second predetermined voltage during the detection of the second predetermined voltage.

16. The coordinate input device according to claim 13, wherein said processor operates in either one of a low power consumption mode such that said processor is in a standby mode and consumes substantially less power than it would during standard operations and a normal power consumption mode such that said processor consumes an amount of power that it would during standard operations and, while the logic circuit monitors the variation of the predetermined voltage, said processor operates in the low power consumption mode.

17. The coordinate input device according to claim 13, wherein said processor operates in either one of a low power consumption mode such that said processor is in a standby mode and consumes substantially less power than it would during standard operations and a normal operation mode such that said processor consumes an amount of power that it would during standard operations during the loading of the coordinate value.

18. The coordinate input device according to claim 13, wherein said A/D converter is arranged between and connected to said processor and said selection means, said processor being provided with a correspondence table of said A/D converter output values and at least one of x-coordinate and y-coordinate values, thereby obtaining x and y coordinate values from the A/D converter output values according to the correspondence table.

19. The coordinate input device of claim 13, wherein said first conductive sheet, said second conductive sheet, and said spacer are substantially transparent, and said coordinate input section is disposed on a screen of a cellular telephone display.

20. The coordinate input device of claim 13, wherein said processor operates in either one of a low power consumption mode distinct from a power consumption mode of the coordinate input section such that the processor is in a standby mode and consumes substantially less power than it would during standard operations, and a normal power consumption mode distinct from the power consumption mode of the coordinate input section such that the processor consumes an amount of power that it would during standard operations and, while the logic circuit monitors the variation of the predetermined voltage, said processor operates in the low power consumption mode.

21. A method for operating a coordinate input device having a processor comprising the steps of:

operating said processor in a first low power consumption mode such that said processor is in a standby mode and consumes substantially less power than it would during standard operations;

monitoring at least one operating parameter of said coordinate input device for any change in the at least one operating parameter while said processor is operating in the first low power consumption mode, the step of monitoring including:

responsive to a first inverter receiving a first signal representing the change in the at least one operating parameter, the first inverter generating an intermediate signal, and responsive to a second inverter receiving the intermediate signal, the second inverter generating an interrupt signal; and responsive to the interrupt signal, switching to operating said processor of said coordinate input device in a first normal power consumption mode such that said processor consumes an amount of power that it would during standard operations.

22. The method of claim 21 comprising the additional steps of:

operating said coordinate input device in a second low power consumption mode; and in response to said monitoring step, switching to operating said coordinate input device in a second normal power consumption mode.

23. The method of claim 22, wherein, when operating said processor in said first normal power consumption mode, said processor determines a location of activity in said coordinate input device which initiated said switching step.

24. The method of claim 21 comprising the additional steps of:

operating said coordinate input device in a second low power consumption mode distinct from the first low power consumption mode of said processor; and in response to said monitoring step, switching to operating said coordinate input device in a second normal power consumption mode distinct from the first normal power consumption mode of the processor.

25. A coordinate input device comprising:
- a coordinate input section configured to generate a change in a first signal responsive to pressure being applied to said coordinate input section;
- a logic circuit connected to said coordinate input section, said logic circuit configured to output an interrupt signal responsive to the change in the first signal, said logic circuit having a first inverter and a second inverter connected in series, each of said first and second inverters having an input and an output, the input of said first inverter configured to receive the change in the first signal and the output of said second inverter configured to generate the interrupt signal; and
- a processor different from said logic circuit and connected to said logic circuit, said processor being configured to switch between a first low power consumption mode of said processor such that said processor is in a standby mode and consumes substantially less power than it would during standard operations, and a first normal power consumption mode of said processor such that said processor consumes an amount of power that it would during standard operations, in response to receiving said interrupt signal.

26. The coordinate input device of claim 25, wherein said processor is configured to control whether said coordinate input section operates in a second low power consumption mode or a second normal power consumption mode responsive to the interrupt signal.

27. The coordinate input device of claim 26 wherein said coordinate input section is configured to send a second signal associated with a location of the pressure upon said coordinate input section to said processor when said coordinate input section is in the second normal power consumption mode.

28. The coordinate input device of claim 26 wherein said coordinate input section is configured to operate in either of a second low power consumption mode distinct from the first low power consumption mode of the processor, or a second normal power consumption mode distinct from the first normal power consumption mode of the processor, said processor controlling whether said coordinate input section operates in the second low power consumption mode or the second normal power consumption mode responsive to receiving the first signal.

29. The coordinate input device of claim 25, further including an A/D converter connected to said coordinate input section and to said processor, said coordinate input section configured to output an analog signal associated with a location of the pressure being applied to said coordinate input section, said A/D converter configured to receive the analog signal when said coordinate input section is in a normal power consumption mode and to send to said processor a digital signal separate from the interrupt signal and associated with the analog signal.

30. The coordinate input device of claim 25, further including a stand-by control section configured to control whether said coordinate input section operates in a second low power consumption mode or a second normal power consumption mode responsive to the interrupt signal, and further configured to set said coordinate input section in the second low power consumption mode responsive to no pressure being applied to said coordinate input section within a predetermined period of time.

31. The coordinate input device of claim 25 wherein the first signal is a variation in a predetermined voltage.

32. The coordinate input device of claim 25, wherein said coordinate input section is disposed on a display of a cellular telephone display.

33. In a coordinate input device, a method comprising the steps of:
- generating a first signal responsive to pressure being applied to a coordinate input section;
- a logic circuit outputting an interrupt signal in response to the first signal, the step of outputting including:
  - responsive to a first inverter receiving the first signal, the first inverter generating an intermediate signal; and
  - responsive to a second inverter receiving the intermediate signal, the second inverter generating an interrupt signal; and
- a processor different from the logic circuit switching between a first low power consumption mode of the processor such that the processor is in a standby mode and consumes substantially less power than it would during standard operations, and a first normal power consumption mode of the processor such that the processor consumes an amount of power that it would during standard operations, responsive to the interrupt signal being output.

34. The method of claim 33 further including the step of switching the coordinate input section between a second low power consumption mode and a second normal power consumption mode responsive to the first signal being output.

35. The method of claim 34 further including the step of the coordinate input section outputting a second signal associated with a location of the pressure being applied to the coordinate input section when said coordinate input section is in the second normal power consumption mode.

36. The method of claim 35 further including the steps of:
- an A/D converter receiving the second signal, wherein the second signal is an analog signal; and
- the A/D converter converting the second signal to a digital signal separate from the first signal;
- the processor determining the location of the pressure being applied to the coordinate input section based on the digital signal.

37. The method of claim 33, further including the steps of:
- a stand-by control section controlling whether the coordinate input section operates in a second low power consumption mode or a second normal power consumption mode responsive to the interrupt signal; and
- the stand-by control section setting said coordinate input section in the second low power consumption mode responsive to no pressure being applied to said coordinate input section within a predetermined period of time.

38. The method of claim 33 wherein the first signal is a variation in a predetermined voltage.

39. The method of claim 33 further including the step of switching the coordinate input section between a second low power consumption mode distinct from the first low power consumption mode of the processor and a second normal power consumption mode distinct from the first normal power consumption mode of the processor responsive to the first signal being output.

40. The method of claim 33 further including the steps of:
- a stand-by control section controlling whether the coordinate input section operates in a second low power consumption mode distinct from the first low power consumption mode or a second normal power consumption mode distinct from the first normal power consumption mode responsive to the first signal; and
- the stand-by control section setting said coordinate input section in the second low power consumption mode responsive to no pressure being applied to said coordinate input section within a predetermined period of time.

* * * * *